(12) United States Patent
Nakamura et al.

(10) Patent No.: US 7,916,590 B2
(45) Date of Patent: Mar. 29, 2011

(54) METHOD FOR OPTIMIZING RECORDING PULSE CONDITION IN DATA RECORDING ONTO OPTICAL INFORMATION RECORDING MEDIA

(75) Inventors: Atsushi Nakamura, Osaka (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 641 days.

(21) Appl. No.: 11/918,227

(22) PCT Filed: Apr. 7, 2006

(86) PCT No.: PCT/JP2006/307456
§ 371 (c)(1),
(2), (4) Date: Oct. 11, 2007

(87) PCT Pub. No.: WO2006/112277
PCT Pub. Date: Oct. 26, 2006

(65) Prior Publication Data
US 2009/0122673 A1 May 14, 2009

(30) Foreign Application Priority Data

Apr. 14, 2005 (JP) .................. 2005-116834

(51) Int. Cl.
*G11B 7/00* (2006.01)
(52) U.S. Cl. .................. 369/47.53; 369/59.12
(58) Field of Classification Search ............. 369/47.27, 369/47.51, 47.52, 47.53, 59.11, 59.12, 116
See application file for complete search history.

(56) References Cited

U.S. PATENT DOCUMENTS

| | | | | |
|---|---|---|---|---|
| 6,430,128 B1 * | 8/2002 | Kato et al. | ............. | 369/47.53 |
| 6,791,926 B1 | 9/2004 | Furumiya et al. | | |
| 7,068,579 B2 * | 6/2006 | Tasaka et al. | ............. | 369/59.24 |
| 7,116,617 B2 * | 10/2006 | Takeda | ............. | 369/47.53 |
| 7,215,618 B2 * | 5/2007 | Adachi | ............. | 369/47.53 |
| 7,295,500 B2 * | 11/2007 | Nakano et al. | ............. | 369/47.53 |
| 7,529,165 B2 * | 5/2009 | Ushiyama et al. | ............. | 369/47.53 |
| 7,751,293 B2 * | 7/2010 | Ushiyama et al. | ............. | 369/59.11 |
| 2003/0151994 A1 | 8/2003 | Tasaka et al. | | |
| 2005/0078579 A1 | 4/2005 | Miyashita et al. | | |
| 2005/0111314 A1 | 5/2005 | Kojima | | |

FOREIGN PATENT DOCUMENTS

| | | |
|---|---|---|
| JP | 2679596 | 11/1997 |
| JP | 2000-200418 | 7/2000 |
| JP | 2004-146043 | 5/2004 |
| JP | 2004-335079 | 11/2004 |
| JP | 2004-355727 | 12/2004 |
| JP | 2005-63472 | 3/2005 |
| JP | 2005-158159 | 6/2005 |
| WO | 02/089123 | 11/2002 |

OTHER PUBLICATIONS

International Search Report (in English language) of Jul. 25, 2006 issued in the International Application No. PCT/JP2006/307456.

* cited by examiner

*Primary Examiner* — Nabil Zhindi
(74) *Attorney, Agent, or Firm* — Wenderoth, Lind & Ponack, L.L.P.

(57) ABSTRACT

A specific recording pattern is sequentially written onto an optical disc using each of three sets of recording pulse conditions as trial writing. The recording patterns are reproduced sequentially. Edge shift amounts of a mark which corresponds to each of three sets of recording pulse conditions are measured from a reproduction signal. Compensation values for the recording pulse conditions are obtained from calculation by linear approximation based on the measured values.

21 Claims, 17 Drawing Sheets

Fig. 4

| Recording pulse conditions | 2T mark | | | | 3T mark | | | | ≥4T mark | | | |
|---|---|---|---|---|---|---|---|---|---|---|---|---|
| Pattern | dTtop | Ttop | dTe | dTtop | Ttop | Tlp | dTe | dTtop | Ttop | Tlp | dTe |
| A (reference) | a | b | c | d | e | f | g | h | i | j | k |
| B | a | b | c | d | e | f | g | h+1 | i+1 | j+1 | k-1 |
| C | a | b | c | d | e | f | g | h-1 | i-1 | j-1 | k+1 |

Fig. 5

| Recording pulse conditions | 2T mark | | | 3T mark | | | | | ≥4T mark | | | |
|---|---|---|---|---|---|---|---|---|---|---|---|---|
| Pattern | dTtop | Ttop | dTe | dTtop | Ttop | Tlp | dTe | dTtop | Ttop | Tlp | dTe |
| D (reference) | a | b | c | d | e | f | g | h' | i' | j' | k' |
| E | a+1 | b+1 | c | d+1 | e+1 | f | g | h' | i' | j' | k' |
| F | a-1 | b | c-1 | d+1 | e | f-1 | g+1 | h' | i' | j' | k' |

Fig. 9

| Starting end | 2T mark | 3T mark | 4T or longer mark |
|---|---|---|---|
| 2T space | | P3A | P1A |
| 3T space | P3B | P1B,P4A | P1B,P2A |
| 4T space | P4B | P2B,P4A | P2B,P2A |
| 5T or longer space | P4B | P2B,P4A | P2B,P2A |

| Terminating end | 2T mark | 3T mark | 4T or longer mark |
|---|---|---|---|
| 2T space | | P6A | P5A |
| 3T space | P6B | P5B,P8A | P5B,P7A |
| 4T space | P8B | P7B,P8A | P7B,P7A |
| 5T or longer space | P8B | P7B,P8A | P7B,P7A |

Fig. 11

| Starting end | 2T mark | 3T mark | 4T or longer mark |
|---|---|---|---|
| 2T space | - | 2S3M | 2S4M |
| 3T space | 3S2M | 3S3M | 3S4M |
| 4T space | 4S2M | 4S3M | 4S4M |
| 5T or longer space | 5S2M | 5S3M | 5S4M |
| All spaces | xS2M | xS3M | xS4M |

| Terminating end | 2T mark | 3T mark | 4T or longer mark |
|---|---|---|---|
| 2T space | - | 3M2S | 4M2S |
| 3T space | 2M3S | 3M3S | 4M3S |
| 4T space | 2M4S | 3M4S | 4M4S |
| 5T or longer space | 2M5S | 3M5S | 4M5S |
| All spaces | 2MxS | 3MxS | 4MxS |

Fig. 12

| Recording pulse conditions | 2T mark | | | 3T mark | | | | ≥4T mark | | | |
|---|---|---|---|---|---|---|---|---|---|---|---|
| Pattern | dTtop | Ttop | dTe | dTtop | Ttop | Tlp | dTe | dTtop | Ttop | Tlp | dTe |
| G (after compensation) | $a+m_{2T}+n_{2T}$ | $b+m_{2T}$ | $c+n_{2T}$ | $d+m_{3T}+n_{3T}$ | $e+m_{3T}$ | $f-n_{3T}$ | $g+n_{3T}$ | h' | i' | j' | k' |
| H | $a+1+m_{2T}+n_{2T}$ | $b+1+m_{2T}$ | $c+n_{2T}$ | $d+1+m_{3T}+n_{3T}$ | $e+1+m_{3T}$ | $f-n_{3T}$ | $g+n_{3T}$ | h' | i' | j' | k' |
| I | $a-1+m_{2T}+n_{2T}$ | $b+m_{2T}$ | $c-1+n_{2T}$ | $d+1+m_{3T}+n_{3T}$ | $e+m_{3T}$ | $f-1-n_{3T}$ | $g+1+n_{3T}$ | h' | i' | j' | k' |

Fig. 14

| Recording pulse condition (G) | | 2T mark | | 3T mark | | ≥4T mark | |
|---|---|---|---|---|---|---|---|
| | | dTtop | Ttop | dTtop | Ttop | dTtop | Ttop |
| Space before | 2T space | $a+m_{2T}+n_{2T}$ | $b+m_{2T}$ | $d+m_{3T}+n_{3T}$ | $e+m_{3T}$ | h' | i' |
| | 3T space | $a+m_{2T}+n_{2T}$ | $b+m_{2T}$ | $d+m_{3T}+n_{3T}$ | $e+m_{3T}$ | h' | i' |
| | 4T space | $a+m_{2T}+n_{2T}$ | $b+m_{2T}$ | $d+m_{3T}+n_{3T}$ | $e+m_{3T}$ | h' | i' |
| | ≥5T space | $a+m_{2T}+n_{2T}$ | $b+m_{2T}$ | $d+m_{3T}+n_{3T}$ | $e+m_{3T}$ | h' | i' |

| Recording pulse condition (J) | | 2T mark | | 3T mark | | ≥4T mark | |
|---|---|---|---|---|---|---|---|
| | | dTtop | Ttop | dTtop | Ttop | dTtop | Ttop |
| Space before | 2T space | G | G | G+1 | G+1 | G+1 | G+1 |
| | 3T space | G | G | G | G | G | G |
| | 4T space | G | G+1 | G | G | G | G |
| | ≥5T space | G+1 | G+1 | G | G | G | G |

METHOD FOR OPTIMIZING RECORDING PULSE CONDITION IN DATA RECORDING ONTO OPTICAL INFORMATION RECORDING MEDIA

TECHNICAL FIELD

The present invention relates to a method for recording information by irradiating an optical information recording medium with laser light and changing physical properties, particularly, to a method for optimizing a recording pulse condition used for recording.

BACKGROUND ART

As conventional optical information recording medium, for example, rewritable optical discs such as DVD-RAMs, DVD-RWs, CD-RWs and the like are known. In such rewritable optical discs, information is rewritten as follows by using laser light. First, an information reproducing apparatus reads out a recording pulse standard condition from a calibration area of an optical disc. Next, the recording and reproducing apparatus irradiates an optical disc with laser light with a waveform which conforms to the recording pulse condition to record information. In order to reduce influence on quality of recording due to variances in optical disc properties and/or recording properties of the recording and reproducing apparatus in such a process, the recording pulse condition to be set has to be optimized. Particularly, when the recording pulse standard condition does not conform to the actual properties of the optical disc, high recording quality has to be secured by optimizing the recording pulse condition.

In a phase change optical disc, heat of the applied laser light forms an amorphous area (mark) and an optical reflectance changes. As a change of the optical reflectance, data is recorded on the optical disc. Particularly, in high-density recording, sizes of a mark to be formed and a space (an area between marks) are small. Thus, the heat of the laser light applied for forming a mark is conducted not only to that mark but also to marks on front and back sides via the spaces. Thus, shapes of the marks may be distorted easily. In order to avoid such distortion, the recording pulse condition is set as follows, for example (see, for example, Japanese Laid-Open Publication Nos. 2000-200418 and 2004-335079). When the laser light is formed of a plurality of pulse train (multipulse), a position of the first pulse varies depending upon a combination of a self-mark length and a length of the front space. On the other hand, a position of the last pulse varies depending upon a combination of the self-mark length and a length of the back space. Such a displacement of the recording pulse compensates for thermal interference between the marks. This type of position control of the recording pulse is generally referred to as recording compensation.

According to a recording method disclosed in Japanese Laid-Open Publication No. 2000-200418, the position of the recording pulse is specified for each of the possible combinations of the mark lengths and the space lengths. The positional information is the recording pulse standard condition. The recording pulse standard condition is read out from the optical disc before recording. Further, the read out recording pulse standard condition is modified, and the recording pulse condition is optimized as follows. First, the positional information related to all the combinations of the mark lengths and the space lengths included in the recording pulse standard condition is used to perform first trial writing to the optical disc. Secondly, the data recorded as a result of the first trial writing is reproduced and a first jitter is detected from a reproduction signal. Thirdly, the positional information related to the all the combinations of the mark lengths and the space lengths included in the recording pulse standard condition is changed uniformly. Fourthly, the uniformly changed positional information is used to perform second trial writing onto the optical disc. Fifthly, the data recorded in the second trial writing was reproduced and a second jitter is detected from the reproduction signal. Sixthly, the first jitter and the second jitter are compared to each other, and the positional information used for the trial writing which generates a smaller jitter is selected as the optimal recording pulse condition.

For optimizing the recording pulse condition, as shown in Japanese Laid-Open Publication No. 2004-335079, for example, a maximum likelihood decoding may be used instead of comparison of jitters. In the maximum likelihood decoding, a pattern which a reproduction signal should have is estimated from an actual waveform of the reproduction signal. Then, the actual waveform of the reproduction signal and the estimated pattern are compared and the most probable pattern is defined. The recording pulse condition is optimized such that a probability that error occurs during decoding becomes the lowest.

SUMMARY OF THE INVENTION

In the conventional method for optimizing the recording pulse condition as described in Japanese Laid-Open Publication No. 2000-200418, trial writing, reproduction of data recorded in the trial writing, and detection of jitters from the reproduction signal are repeated for a plurality of times for each of combinations of mark lengths and space lengths. Therefore, it is difficult to shorten a length of time spent for learning the recording pulse condition when the power is turned on, or a new optical disc is inserted. This means that it is difficult to shorten a length of latency time to start of recording of an image or data. Moreover, the recording pulse condition used for trial writing is changed simply, for example, ±2, ±1, and 0 on an ad hoc basis from the recording pulse standard condition. Thus, if the optimal recording condition is different largely from the recording pulse standard condition, the recording pulse condition has to be changed with several steps. As a result, the number of times of the trial recording cannot be reduced, so it is difficult to shorten the length of the time for learning. On the other hand, when the maximum likelihood decoding is used for optimizing the recording pulse condition as described in Japanese Laid-Open Publication No. 2004-335079, a method for reducing the number of times of trial writing through improving the efficiency is not known yet.

An object of the present invention is to provide a method for optimizing a recording pulse condition by reducing the number of times of trial writing and shortening a length of time required for learning, and a recording and reproducing apparatus using the same.

A recording and reproducing apparatus according to the present invention preferably uses the method below for optimizing recording pulse conditions. The method for optimizing preferably includes the steps of:

generating recording pulses using each of multiple sets of recording pulse conditions in which portions of recording pulses which correspond to marks of two types or more have different lengths or phases, and recording a specific pattern of a mark and space onto tracks of a writable optical information recording medium based on the recording pulses;

measuring an edge shift amount of a reproduction signal for each of areas of the tracks on which the specific pattern is recorded with each of the multiple sets of recording pulse conditions by reproducing a signal from each of the areas;

calculating a length shift or phase shift of a mark from the edge shift amount for each of the areas; and calculating compensation values for the recording pulse conditions based on a difference in lengths or a difference in phases of the mark among the multiple sets of the recording pulse conditions using approximation that the difference in lengths or the difference in phases of the mark among the areas is proportional to the difference in the lengths or the difference in the phases of the portions of the recording pulses. These steps are preferably performed by a semiconductor integrated circuit incorporated to the recording and reproducing apparatus.

In the optimizing method according to the present invention, the compensation values for the recording pulse conditions are obtained by the calculation using linear approximation. Thus, the number of times of trial writing required can be readily reduced, and a time period required for learning recording pulse conditions is short.

Preferably, the marks of two types or more include a shortest mark and a mark having a length next to that of the shortest mark. For example, in BD, the length of the shortest mark is twice the length of recording clock cycle. The length of the mark having the length next to that is three times the length of the recording clock cycle. In general, these short marks show a variance depending upon the optical discs or recording and reproducing apparatuses in the optimal recording pulse condition which is larger than that of the long marks. The above method for optimizing according to the present invention can efficiently reduce the entire process time by covering the recording pulse condition related to short marks.

Preferably, code lengths appear at substantially equal frequencies in a recording signal corresponding to the recording pulses. In the recording signal, particularly, rate of appearance of the long marks are higher than that in the recording signal based on a normal modulation method. Thus, clock reproduced from the area of the tracks of the optical information medium on which trial writing is performed using such a recording signal is highly stable. Further, the area includes a variety of combinations between the mark lengths and the space lengths. Therefore, a variance in compensation values depending upon the combinations of the mark length and the space length can be averaged efficiently by using the edge shift amount of the signal reproduced from such an area for optimizing the recording pulse conditions.

Preferably, among the multiple sets of recording pulse conditions, when a phase of a portion of a recording pulse which corresponds to one type of mark is advanced, phases of portions of recording pulses which correspond to other types of marks are delayed. Thus, a change in phase in the clock reproduced from the area of the tracks of the optical information medium on which trial writing is performed using such recording conditions is small. Accordingly, the edge shift amount of the reproduction signal can be measured precisely.

Preferably, the recording pulse includes a first pulse, a last pulse, or a cooling pulse, and, among the multiple sets of recording pulse conditions, a length, a phase, or a position of at least one of the first pulse, the last pulse, and the cooling pulse varies. Further preferably, between two of the multiple sets of recording pulse conditions, one or both of a length and a rising position of the first pulse vary; and between other two of the multiple sets of recording pulse conditions, one or both of a length and a phase of the last pulse, a phase of the first pulse, and a phase of the cooling pulse vary. Preferably, the specific pattern includes marks and spaces having a length between twice and eightfold the length of a recording clock cycle.

In the above method for optimizing recording pulse conditions according to the present invention, calculation for obtaining compensation values for the recording pulse conditions preferably uses linear approximation below. First, combinations of values of the two parameters vary among the multiple sets of recording pulse conditions. Next, a difference in lengths and a difference in phases of marks between two of the multiple sets of recording pulse conditions are referred to as L12 and P12; a difference in lengths and a difference in phases of marks between other two of the multiple sets of recording pulse conditions are referred to as L13 and P13; a length shift and a phase shift of marks recorded on tracks with one of the multiple sets of recording pulse conditions is referred as L and P; and target values of the mark length shift and the phase shift are referred to as Lt and Pt. The compensation values of the above-mentioned two parameters, m and n, are calculated from the following equations:

$$m = \frac{(P \times L13 - L \times P13)}{(L12 \times P13 - P12 \times L13)} + \frac{(Pt \times L13 - Lt \times P13)}{(L12 \times P13 - P12 \times L13)};$$

and $$n = \frac{(L \times P12 - P \times L12)}{(L12 \times P13 - P12 \times L13)} + \frac{(Lt \times P12 - Pt \times L12)}{(L12 \times P13 - P12 \times L13)}.$$

Preferably, the target values Lt and Pt are decided such that the quality of the reproduction signal is high. Further preferably, the target values Lt and Pt vary depending upon the mark length, and particularly, one or both of the target values Lt and Pt are zero. On the other hand, the compensation values m and n are rounded off to integers. Furthermore, the steps are repeated until both the compensation values m and n become zero.

Preferably, the steps of measuring the edge shift amount of the reproduction signal further includes the steps of:

converting a digital signal produced from the reproduction signal to a digitized signal by a maximum likelihood decoding method;

selecting a pattern approximate to a shape of a portion of the digital signal which corresponds to an edge of a mark from a predetermined pattern group based on the digitized signal; and comparing the selected pattern with a shape of the portion of the digital signal. Further preferably, the step of measuring the edge shift amount of the reproduction signal includes the following three steps.

1. A step of measuring the edge shift amount for each of possible combinations between the mark lengths and space lengths.

2. A step of calculating dispersion values SP among the combinations for differences between average values of respective edge shift amounts at a leading edge and a trailing edge of a mark and respective edge shift amounts for each of possible combinations between mark lengths and space lengths for each type of marks from the following equation, $$SP = \sum_{i,j} Csm[i][j] \times (SM[i][j] - AveSM[j])^2 +$$

-continued $$\sum_{i,j} Cms[i][j] \times (MS[i][j] - AveMS[i])^2,$$

where a pair of integers (i, j) is a pair of integers greater than or equal to 2 except (2, 2), a variable SM[i][j] is an edge shift amount between a space which has a length i times the length of recording clock cycle T (hereinafter, referred to as an iT space) and the mark immediately after which has a length j times the length of recording clock cycle T (hereinafter, referred to as a jT mark), a variable MS[i][j] is an edge shift amount between the iT mark and a jT space immediately after; a variable AveSM[j] is an average value of an edge shift amount of a leading edge of the jT mark, a variable AveMs[i] is an average value of an edge shift amount of a trailing edge of the iT mark, and a first coefficient Csm[i][j] and a second coefficient Cms[i][j] are predetermined numbers.

3. A step of, when the dispersion value SP is smaller than a predetermined value, adjusting the recording pulse conditions on a mark basis, and, when the dispersion value SP is larger than the predetermined value, adjusting the recording pulse conditions on a combination basis.

With these three steps, the number of times of trial writing can be efficiently reduced by using the maximum likelihood decoding method. Thus, a time period required for optimizing the recording pulse conditions can be further reduced. Preferably, the first coefficient Csm[i][j] is represented as a rate of appearance of a combination of an iT space and a jT mark immediately after, and the second coefficient Cms[i][j] is represented as a rate of appearance of a combination of an iT mark and a jT space immediately after. Further preferably, the first coefficient Csm[i][j] and the second coefficient Cms[i][j] are one or zero.

An optical information recording medium of the present invention is an optical information recording medium on which data is recorded using the recording pulse conditions optimized by the above method for optimizing the recording pulse conditions according to the present invention. The optical information recording medium may include a recording condition calibration area which includes an area on which marks and spaces of types of a predetermined number are recorded at a substantially equal rate of appearance. Preferably, the optical information recording medium includes an area on which data, which represents a difference in lengths or a difference in phases among marks recorded using each of two sets of recording pulse conditions in which portions of recording pulses which correspond to marks of two types or more have different lengths or phases, is recorded. The above method for optimizing the recording pulse conditions according to the present invention may further include the step of recording the above data onto the optical information recording medium. Preferably, when the above optimizing method according to the present invention is applied to the optical information recording medium, the above data is previously read from the optical information recording medium. This allows the recording pulse conditions to be optimized quickly.

The above method for optimizing the recording pulse conditions according to the present invention enables data recording with optimal recording pulse condition irrespective of a variance in properties of writable optical information recording media and/or recording properties of recording and reproducing apparatuses. Therefore, in the optical information recording medium on which data is recorded by the recording and reproducing apparatus using such an optimizing method, a reproduction signal has a high quality. In the above optimizing method according to the present invention, particularly, the number for times of trial writing required for learning the recording pulse conditions can be further reduced. Thus, a time period for starting up the recording and reproducing apparatus can be further reduced and latency time until recording of images or data is started can be further reduced. Furthermore, in an optical information recording medium on which data can be recorded only once, such as a write-once read many optical disc, areas required for trial recording can be saved. Thus, the allowable upper limit for the number of times of learning recording pulse conditions is increases. As a result, optimizing the recording pulse conditions can be stably performed for a long period of time.

BRIEF DESCRIPTION OF THE DRAWINGS

In FIG. 2A, a path shown by a broken line is a correct answer, and a leading edge of a mark A− which corresponds to an actual input signal is delayed from the leading edge of the ideal mark A.

In FIG. 2B, a path shown by a broken line is a correct answer, and a leading edge of a mark A+ which corresponds to an actual input signal comes earlier than the leading edge of the ideal mark A.

In FIG. 3A, a path shown by a bold solid line is a correct answer, and a leading edge of a mark B− which corresponds to an actual input signal is delayed from the leading edge of the ideal mark B.

In FIG. 3B, a path shown by a bold solid line is a correct answer, and a leading edge of a mark B+ which corresponds to an actual input signal comes earlier than the leading edge of the ideal mark B.

FIG. 4 is a table showing values of parameters of recording pulse conditions generated at a first step of a method for optimizing the recording pulse conditions according to an embodiment of the present invention.

FIG. 5 is a table showing values of parameters of recording pulse conditions generated at a fourth step of the method for optimizing the recording pulse conditions according to an embodiment of the present invention.

FIG. 9 is a table for specifying paths which corresponds to combinations of space lengths and mark lengths from the patterns shown in FIG. 8.

FIG. 11 is a table showing edge shift amounts obtained at a fifth step of the method for optimizing the recording pulse conditions according to an embodiment of the present invention for each of the combinations between the mark lengths and the space lengths.

FIG. 12 is a table showing values of parameters of recording pulse conditions compensated at a seventh step of the method for optimizing the recording pulse conditions according to an embodiment of the present invention.

FIG. 14 is a diagram showing values of parameters of the recording pulse conditions generated at a ninth step of the method for optimizing the recording pulse conditions according to an embodiment of the present invention.

DETAILED DESCRIPTION OF THE INVENTION

Hereinafter, preferable embodiments of the present invention are described.

Figure 10:
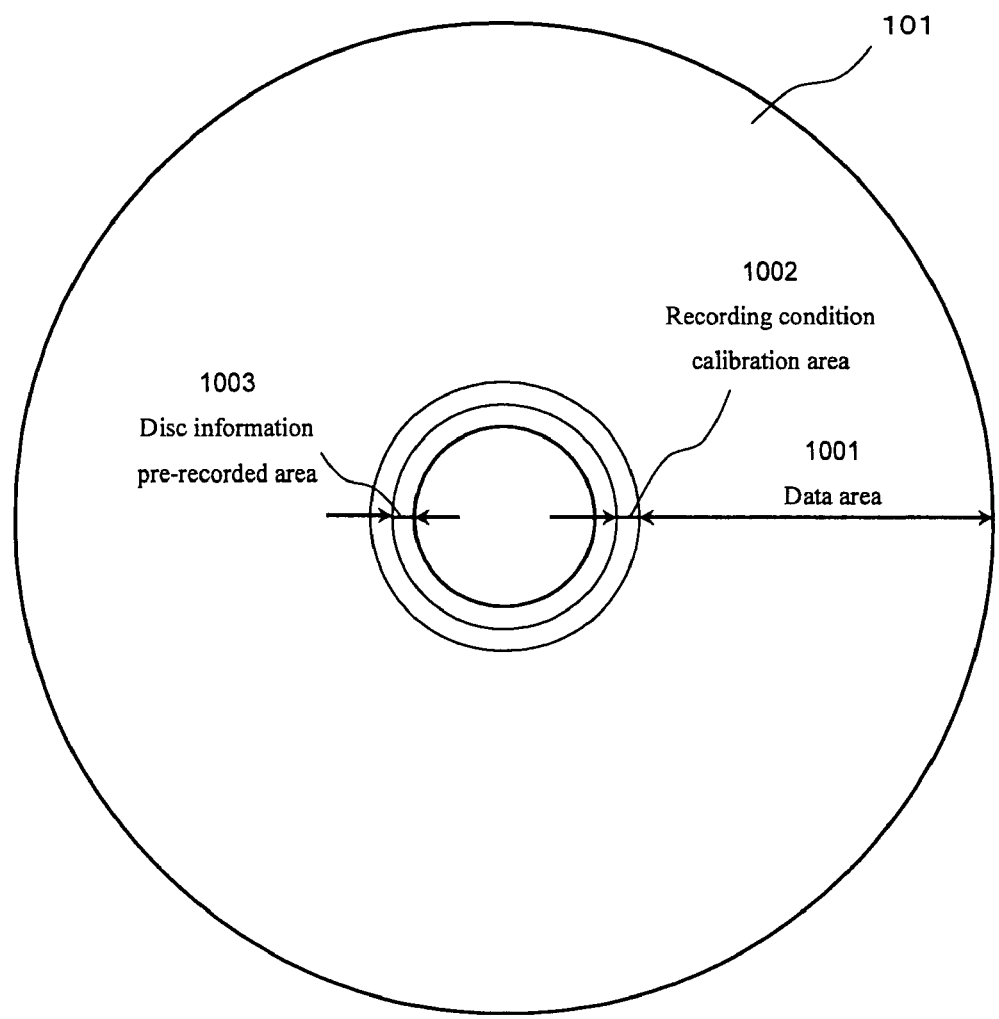
FIG. 10 is a plan view showing a structure of an optical information recording medium according to an embodiment of the present invention.

In an optical information recording medium according to an embodiment of the present invention, laser light applied from outside forms marks having different physical properties to record data. As such an optical information recording medium, preferably, a rewritable phase change optical disc (particularly, a rewritable blu-ray disc (BD-RE), which is simply referred to as an optical disc hereinafter) is used. As shown in FIG. 10, an optical disc 101 is preferably separated into a data area 1001, a recording condition calibration area 1002, and a disc information pre-recorded area 1003. The data area 1001 covers most of the optical disc 101. User data is recorded on the data area 1001. The recording condition calibration area 1002 is provided on an inner peripheral portion of the optical disc 101 and is adjacent to the data area 1001. Onto the recording condition calibration area 1002, trial recording for learning recording conditions is performed. Trial recording is performed when a recording and reproduction apparatus is turned on, when a temperature changes, and before data is recorded onto the data area 1001. The recording and reproduction apparatus adjusts the recording conditions (particularly, recording power, recording pulse condition and the like) by the trial recording. The disc information pre-recorded area 1003 is provided in an innermost portion of the optical disc 101 and is adjacent to the recording condition calibration area 1002. Onto the disc information pre-recorded area 1003, a recommended value for the recording power, a recommended value for the recording pulse condition (hereinafter, referred to as a recording pulse standard condition), recording linear speed, disc ID, and the like, which are preset for each optical disc 101, are recorded. The disc information pre-recorded area 1003 is a read-only area. The information is preferably recorded semipermanently by using a formed portion on a substrate of the optical disc 101 such as meandering (wobbling) of tracks, pits and the like.

Figure 1:
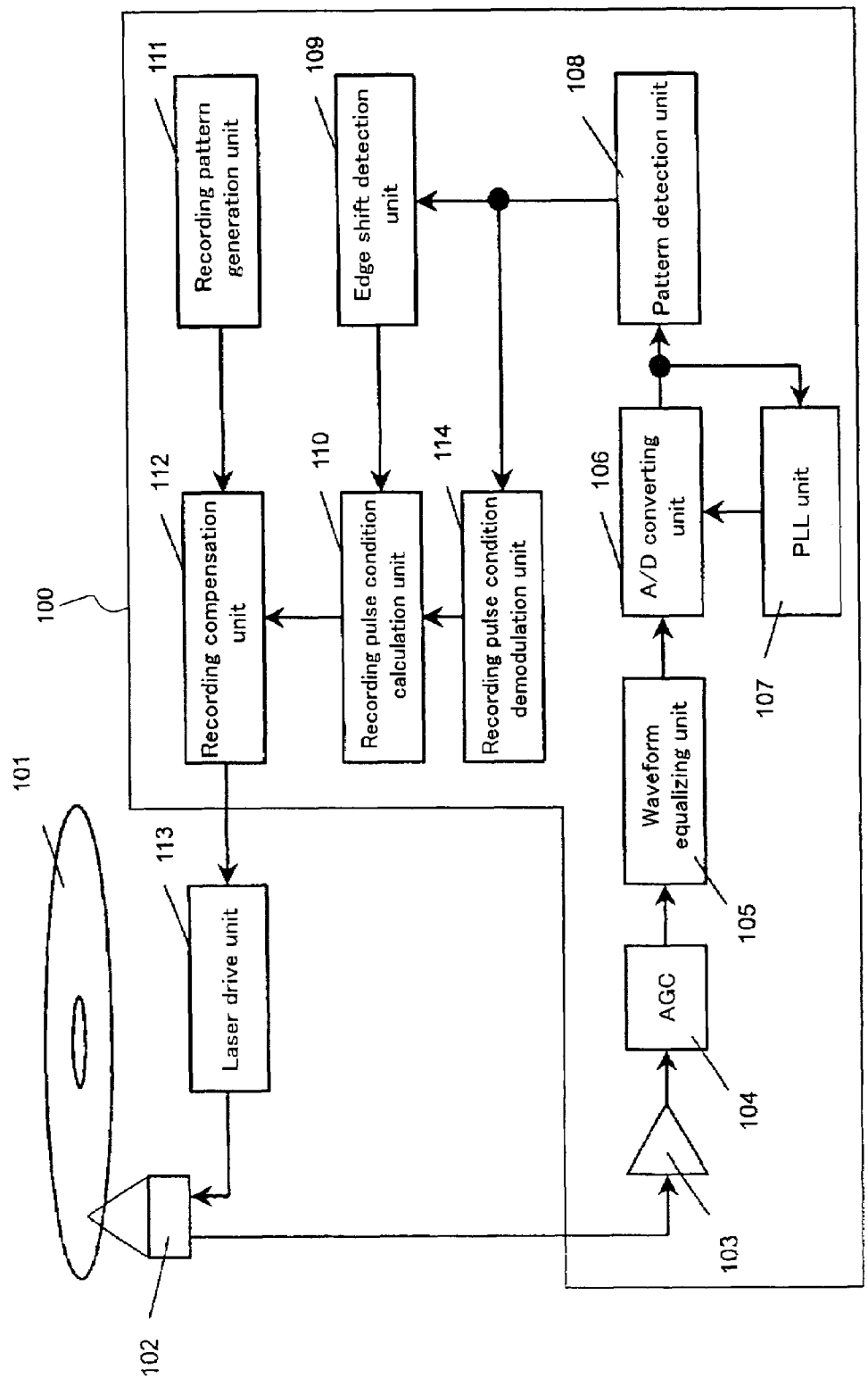
FIG. 1 is a block diagram showing a structure of an optical information recording and reproducing apparatus according to an embodiment of the present invention.

As shown in FIG. 1, a recording and reproduction apparatus according to an embodiment of the present invention includes a light irradiation unit 102, a preamplifier unit 103, an AGC unit 104, a waveform equalization unit 105, an A/D conversion unit 106, a PLL unit 107, a pattern detection unit 108, an edge shift detection unit 109, a recording pulse condition demodulation unit 114, a recording pulse condition calculation unit 110, a recording pattern generation unit 111, a recording compensation unit 112, and a laser drive unit 113. Preferably, components other than the laser drive unit 113 are integrated into one semiconductor integrated circuit 100. The laser drive unit 113 may be further integrated to the semiconductor integrated circuit 100.

The light irradiation unit 102 is preferably an optical pickup and includes a laser diode and a photodetector. The laser diode irradiates laser light onto the optical disc 101 mentioned above. The photodetector detects laser light reflected off the optical disc 101 and converts it into an electrical signal to output as an analog reproduction signal. The analog reproduction signal is processed by the preamplifier unit 103, the AGC (automatic gain control) unit 104, the waveform equalization unit 105 and the A/D conversion unit 106 in turn, and is converted into a digital reproduction signal. Then, the PLL unit 107 extracts reproduction clock from the digital reproduction signal. On the other hand, the A/D conversion unit 106 samples the analog reproduction signal in accordance with the reproduction clock.

The pattern detection unit 108 preferably includes a maximum likelihood decoding unit (preferably a viterbi decoding unit). The pattern detection unit 108 first shapes the digital reproduction signal such that it conforms to frequency characteristics of the maximum likelihood decoding unit (preferably PR(1, 2, 2, 1) characteristics). The maximum likelihood decoding unit converts the digital reproduction signal by the maximum likelihood decoding method (preferably viterbi decoding method) into a digitized signal (preferably a non return to zero inverted (NRZI) signal). Then, the pattern detection unit 108 selects a pattern having a shape close to a portion of the digital reproduction signal which corresponds to an edge of a mark based on the digitized signal from a predetermined group of patterns (see FIG. 8). The edge shift detection unit 109 compares the pattern selected by the pattern detection unit 108 with the shape of the above-mentioned portion of the digital reproduction signal, and measures an amount of edge shift of the mark (shift of an actual edge position of the mark from an ideal edge position of the mark).

The recording pulse condition demodulation unit 114 extracts a recording pulse standard condition recorded on the optical disc 101 from the above digitized signal. The recording pulse condition calculation unit 110 modifies parameters included in the recording pulse standard condition. The recording pulse condition calculation unit 110 particularly compensates the above parameters based on the measured edge shift amount. The recording pattern generation unit 111 outputs a predetermined recording signal preferably as an NRZI signal when data is recorded to the optical disc 101. The recording compensation unit 112 sets the recording pulse condition in accordance with the result of calculation by the recording pulse condition calculation unit 110. The recording compensation unit 112 converts the above NRZI signal into a recording pulse in accordance with the recording pulse condition. The laser drive unit 113 drives a laser diode in the light irradiation unit 102. The laser drive unit 113 controls the power of the laser light in accordance with the above recording pulse particularly for recording data to the optical disc 101 and records data on the optical disc 101.

For the description below, the following numerical value conditions are assumed. The light irradiation unit 102 uses laser having a wavelength of 405 nm and an objective lens of NA=0.85. The optical disc 101 has a track pitch of 0.32 μm. A thickness of a cover layer which covers a surface on which the laser light impinges is between 75 and 100 μm. Further, the shortest length of a mark recorded on the optical disc 101 is twice as large as a recording clock cycle T (=2T), and is between 0.138 and 0.160 μm. The mark lengths and space lengths are all multiples of the recording clock cycle T by the factor of 2, 3, . . . , and 8 (=2T, 3T, . . . , 8T). The recording rate of the recording and reproducing apparatus is BD reference speed (channel rate of 66 MHz (Tw=15.15 nsec)), or BD double speed (channel rate of 132 MHz (Tw=7.58 nsec)).

Figure 13:
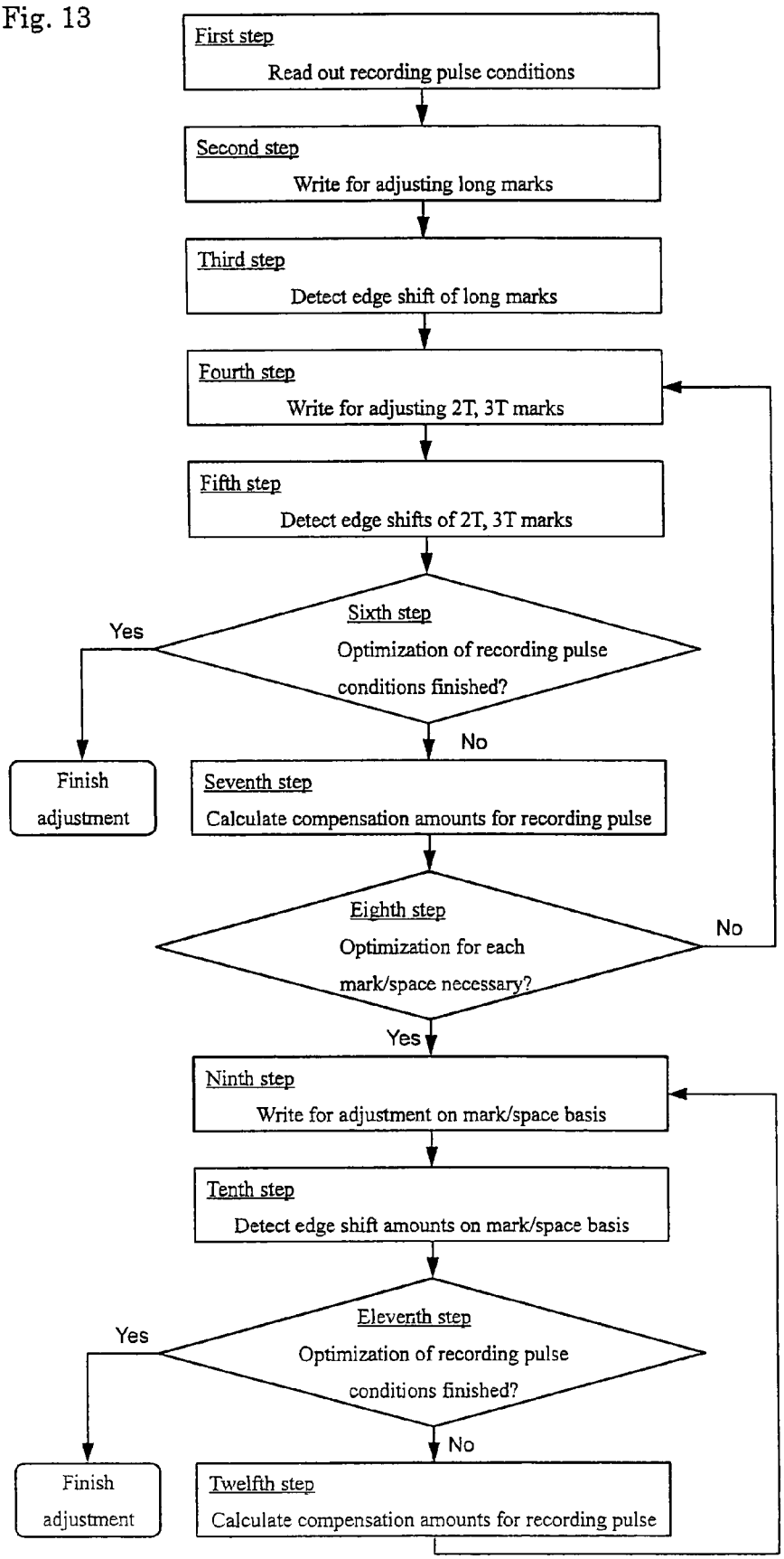
FIG. 13 is a flow diagram showing the method for optimizing the recording pulse conditions according to an embodiment of the present invention

The recording and reproduction apparatus according to an embodiment of the present invention preferably optimizes the recording pulse condition for recording data onto the optical disc 101 in accordance with a flow diagram shown in FIG. 13.

[First Step]

Figure 6:
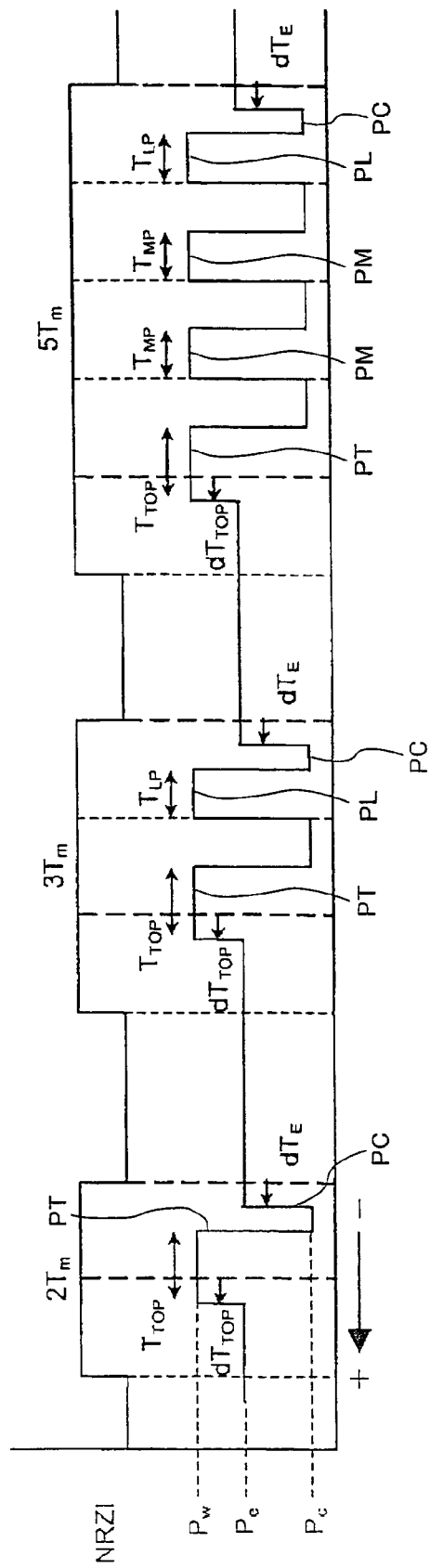
FIG. 6 is a waveform diagram showing correspondence between parameters of recording pulse conditions used in the method for optimizing the recording pulse conditions according to an embodiment of the present invention and waveforms of the recording pulses.

The recording and reproduction apparatus first accesses the disc information pre-recorded area 1003 of the optical disc 101 to read out the initial value information. During such a process, the recording pulse condition demodulation unit 114 extracts the recording pulse condition from the read out initial value information. The extracted recording pulse standard condition is stored into different memory areas for each of the parameters. The recording pulse conditions preferably include parameters shown in FIG. 4. These parameters are classified into parameters related to a 2T mark, parameters related to a 3T mark, and parameters related to a mark having a length of 4T or longer. The parameters DTtop, Ttop, Tlp, and dTe shown in FIG. 4 define waveforms of recording pulses (see FIG. 6). FIG. 6 shows waveforms of recording pulses corresponding to portions 2Tm, 3Tm, and 5Tm of the NRZI signal which respectively indicates recording of a 2T mark, a 3T mark and a 5T mark. The recording pulses preferably include a first pulse PT, a middle pulse PM, a last pulse PL, and a cooling pulse PC. The first pulse PT and the cooling pulse PC are used for recording all kinds of marks. The last pulse PL is preferably used for recording a mark having a length of 3T or longer. The middle pulse PM is preferably used for recording a mark having a length of 4T or longer, and the number thereof increases as the mark length increases. The first parameter dTtop represents a leading edge of the first pulse PT with respect to a predetermined reference position of the NRZI signal. The second parameter Ttop represents a width of the first pulse PT. The third parameter Tlp represents a width of the last pulse PL. The fourth parameter Tmp represents a width of the middle pulse PM. The fifth parameter dTe represents a trailing edge of the cooling pulse PC with respect to a predetermined reference position of the NRZI signal. Herein, the first parameter dTtop and the fifth parameter dTe have polarities. In FIG. 6, a leftward direction (a direction from the trailing edge of a mark toward the leading edge) is a positive direction.

Values a through k of parameters shown in FIG. 4 are represented preferably in units of reference time interval Tw determined by recording clocks. In the case of BD-REs, the unit is equal to 1/16 of the reference time interval Tw (=Tw/16, which is Tw=7.58 nsec in BD double-speed). Furthermore, the values a through k of parameters shown in FIG. 4 can be represented by integral multiples of the unit Tw/16. For example, in the recording pulse standard condition A, that value H of the first parameter dTtop related to marks having a length of 4T or longer represents that "the leading edge of the first pulse PT is at a position of h×Tw/16 [nsec] from the predetermined reference position of the NRZI signal". If the values of the recording pulse standard conditions recorded on the optical disc 101 are represented in the same unit, Tw/16, the recording and reproducing apparatus uses values recorded on the optical disc 101 as they are. On the other hand, if the values of the recording pulse standard conditions recorded on the optical disc 101 are represented in units of nanoseconds, the recording and reproducing apparatus converts the values to integral values closest to the unit Tw/16. Besides, the recording and reproducing apparatus may divide into units smaller than those of the values recorded on the optical disc 101. This improves precision of compensation. Thus, the edge positions of the marks can be adjusted with a high precision. Therefore, quality of a signal read out from a written mark improves. More specifically, when values of the recording pulse standard condition recorded on the optical disc 101 is represented in the unit Tw/16, the recording and reproducing apparatus doubles the values read out from the optical disc 101 and stores into the memory. In this way, the unit can be set to half the above unit, Tw/32.

The recording pulse condition calculation unit 110 sets values h, i, j, and k of the four parameters dTtop, Ttop, Tlp and dTe related to marks having a length of 4T or longer among the parameters included in the recording pulse standard condition A read out from the optical disc 101 as reference values. The recording pulse condition calculation unit 110 further modifies the reference values as follows to set two different recording pulse conditions B and C (See FIG. 4). The recording pulse condition calculation unit 110 first increases the reference values h, i and j of three parameters dTtop, Ttop, and Tlp by one unit, and reduces the reference value k of the fourth parameter dTe by one unit to store it as the recording pulse condition B into the memory. Next, the recording pulse condition calculation unit 110 first reduces the reference values h, i and j of three parameters dTtop, Ttop, and Tlp by one unit, and increases the reference value k of the fourth parameter dTe by one unit to store it as another recording pulse condition C into the memory. As can be seen from FIG. 6, with the recording pulse condition B, a width of the first pulse PT, which is included in a portion of a recording pulse which corresponds to a 5T mark, is expanded compared to that of the recording pulse standard condition A. Also, a rising position comes earlier. Thus, a leading edge of the 5T mark comes earlier. Further, since a width of the last pulse PL expands and a phase of the cooling pulse PC is delayed, a trailing edge of the 5T marks comes later. Accordingly, with the recording pulse condition B, a mark having a length of 4T or longer becomes longer compared to that with the recording pulse standard condition A. On the other hand, with the recording pulse condition C, a width of the first pulse PT, which is included in a portion of the recording pulse which corresponds to a 5T mark, is smaller compared to that with the recording pulse standard condition A. Further, the rising position is delayed. Thus, a leading edge of the 5T mark comes late. Further, since the width of the last pulse PL is reduced and the phase of the cooling pulse PC advances, a trailing edge of the 5T mark comes earlier. Accordingly, with the recording pulse condition C, marks having a length of 4T or longer becomes shorter than that with the recording pulse standard condition A.

[Second Step]

The recording and reproducing apparatus first moves an optical spot to be applied onto the optical disc 101 from the light irradiation unit 102 to a track in the recording condition calibration area 1002 to perform focusing and tracking. Next, the recording and reproducing apparatus performs trial recording of a recording signal having one predetermined pattern onto the recording condition calibration area 1002 of the optical disc 101 (see FIG. 10) using each of three recording pulse conditions A, B and C. Herein, preferably, marks and spaces included in the employed pattern are all longer than the spot size of the laser of the light irradiation unit 102 by a sufficient amount. More preferably, the recording pattern generation unit 111 generates a single pattern formed of repetition of 5T marks and 5T spaces (hereinafter, referred to as 5T single signal). The recording compensation unit 112 generates recording pulses from the recording 5T single signal and the recording pulse conditions A, B, and C. The laser drive unit 113 drives the laser diode in the light irradiation unit 102 in accordance with the recording pulses and sequentially writes the 5T single signal onto tracks of the optical disc 101 in units of sectors. In this way, patterns of the 5T single signal are sequentially recorded on the recording condition calibration area 1002 of the optical disc 101 for three sets of recording pulse conditions A, B, and C, respectively.

[Third Step]

The recording and reproducing apparatus sequentially reproduces the 5T single signal written by using the recording pulse conditions A, B, and C from the recording condition calibration area 1002 of the optical disc 101 to measure the edge shift amounts or asymmetry of the reproduction signals.

First, the reproduction signal output from the light irradiation unit 102 is processed at the preamplifier unit 103, the AGC unit 104, the waveform equalization unit 105, and the A/D conversion unit 106 in turn, and is converted into a digitized signal by the maximum likelihood decoding unit in the pattern detection unit 108. Next, the pattern detection unit 108 measures the edge shift amount of the reproduction signal based on the digitized signal. In this example, it is assumed that the maximum likelihood decoding unit conforms to the PR (1, 2, 2, 1) method.

Figure 8:
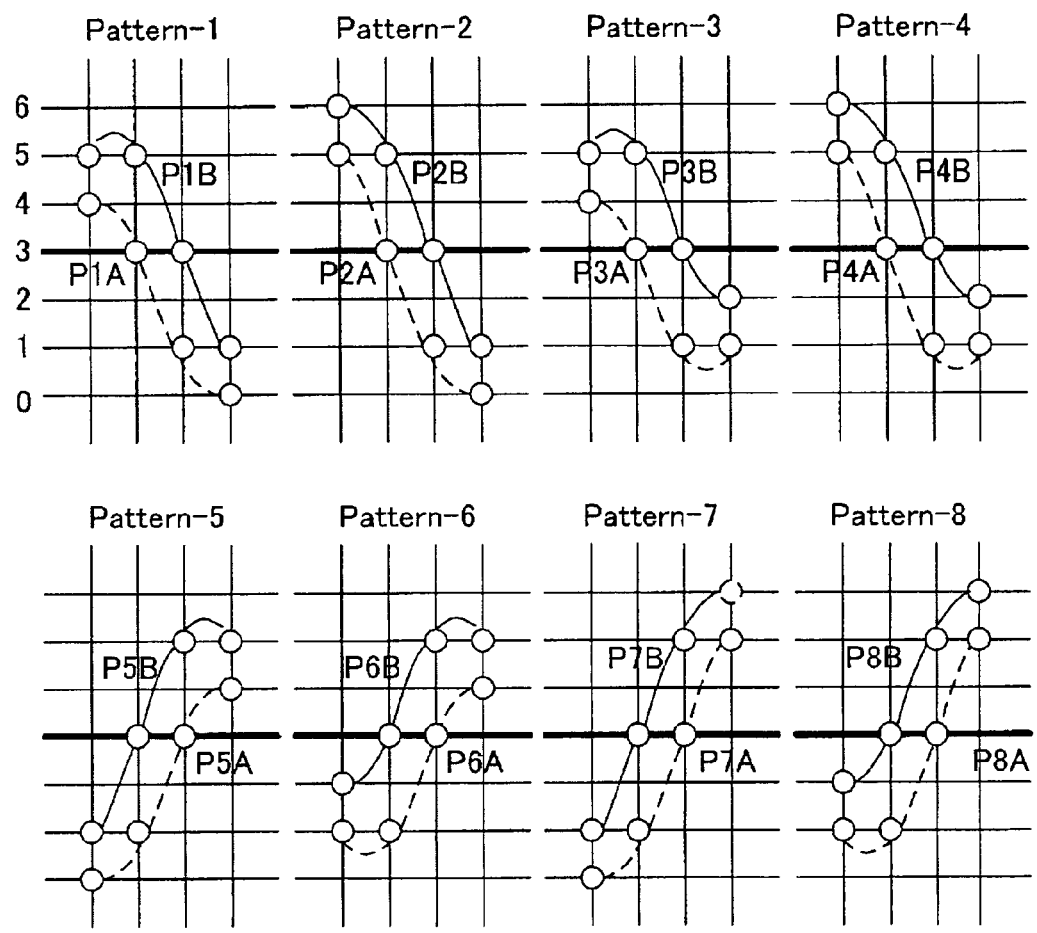
FIG. 8 is a graph showing ideal eight patterns of a reproduction signal corresponding to an edge of a mark which is used in the method of detecting edge shift amounts according to an embodiment of the present invention.

First, the pattern detection unit 108 selects a pattern having a shape close to the shape of the portion of a digital reproduction signal input into the maximum likelihood decoding unit (hereinafter, referred to as an input signal) which corresponds to an edge of a mark from a predetermined group of patterns (see FIG. 8). The pattern group preferably includes eight patterns (Pattern-1 through Pattern-8). Each of the patterns further includes two types of paths, PXA and PXB (X=1, 2, . . . , 8). In FIG. 8, the horizontal axis indicates time (one division of the scale represents one cycle of channel clock; the vertical axis indicates a level of the input signal shaped so as to conform to the PR (1, 2, 2, 1) characteristics by the pattern detection unit 108). Broken lines and solid lines shown in FIG. 8 represent two types of paths, PXA and PXB (X=1, 2, . . . , 8). Circles shown in FIG. 8 correspond to expected values of samples to be included in the paths at channel clock cycle. In particular, the PR (1, 2, 2, 1) characteristics may have six levels, 0 through 6. The patterns represent sequential 7 bit codes. They correspond to one of possible combinations of 6 bits other than the central bit (for example, Pattern-2 represents a bit sequence "1, 1, 1, x, 0, 0, 0 (x=0,1)". Furthermore, two types of paths, PXA and PXB correspond to two values of the central bit (for example, path P2A of Pattern-2 represents a bit sequence "1, 1, 1, 0, 0, 0, 0". At the leading edge of the mark, the reflected light is reduced. Thus, a portion of the input signal which corresponds to the leading edge of the mark is reproduced as a downward waveform. At the trailing edge of the mark, the reflected light is increased. Thus, a portion of the input signal which corresponds to the trailing edge of the mark is reproduced as an upward waveform. Therefore, in FIG. 8, four patterns shown in the upper part (Pattern-1, Pattern-2, Pattern-3, and Pattern-4) correspond to leading edges of the marks; four patterns shown in the lower part (Pattern-5, Pattern-6, Pattern-7, and Pattern-8) correspond to trailing edges of the marks. As shown in FIG. 9, each of paths having such patterns corresponds to one of the combinations of the mark lengths and the space lengths. The single pattern recorded on the optical disc 101 at the second step is a repetition of 5T marks and 5T spaces. In such a case, the shape of the portion of the input signal corresponds to the leading edge of the 5T mark has Pattern-2 (see FIG. 9). Thus, the pattern detection unit 108 selects Pattern-2 for the leading edge of the 5T mark. On the other hand, the shape of the portion of the input signal corresponds to the trailing edge of the 5T mark has Pattern-7 (see FIG. 9). Thus, the pattern detection unit 108 selects Pattern-7 for the trailing edge of the 5T mark.

Next, the edge shift detection unit 109 compares Pattern-2 selected by the pattern detection unit 108 with the shape of the portion of the input signal which corresponds to the leading edge of the 5T mark and measures the edge shift amount at the leading edge of the 5T mark as follows (see FIGS. 2 and 3).

Figure 2A:
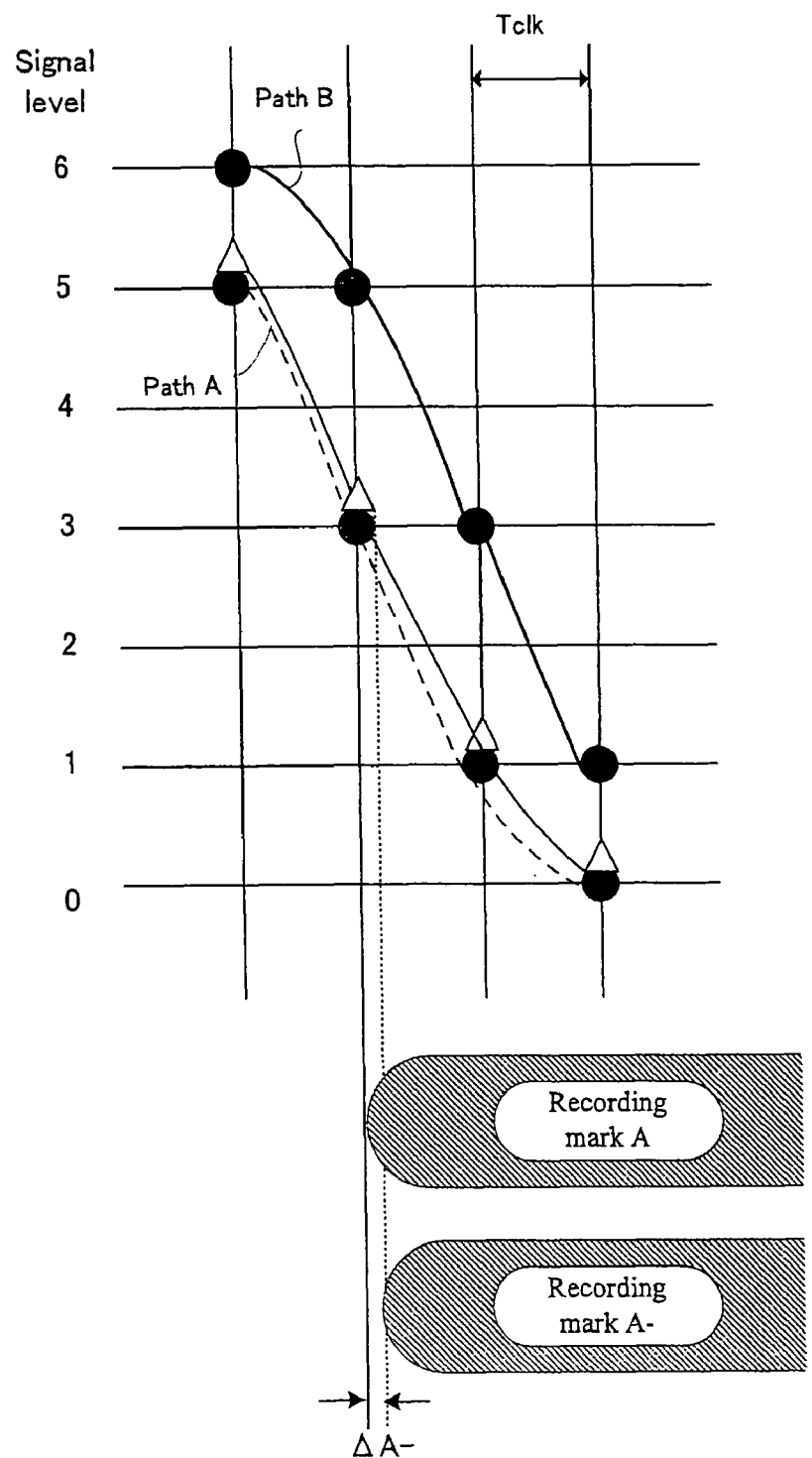
FIG. 2A is a diagram showing a relationship between two paths representing ideal patterns of a reproduction signal which corresponds to a leading edge of a mark and an actual waveform, which is used in a method of detecting edge shift amounts according to an embodiment of the present invention.
Figure 2B:
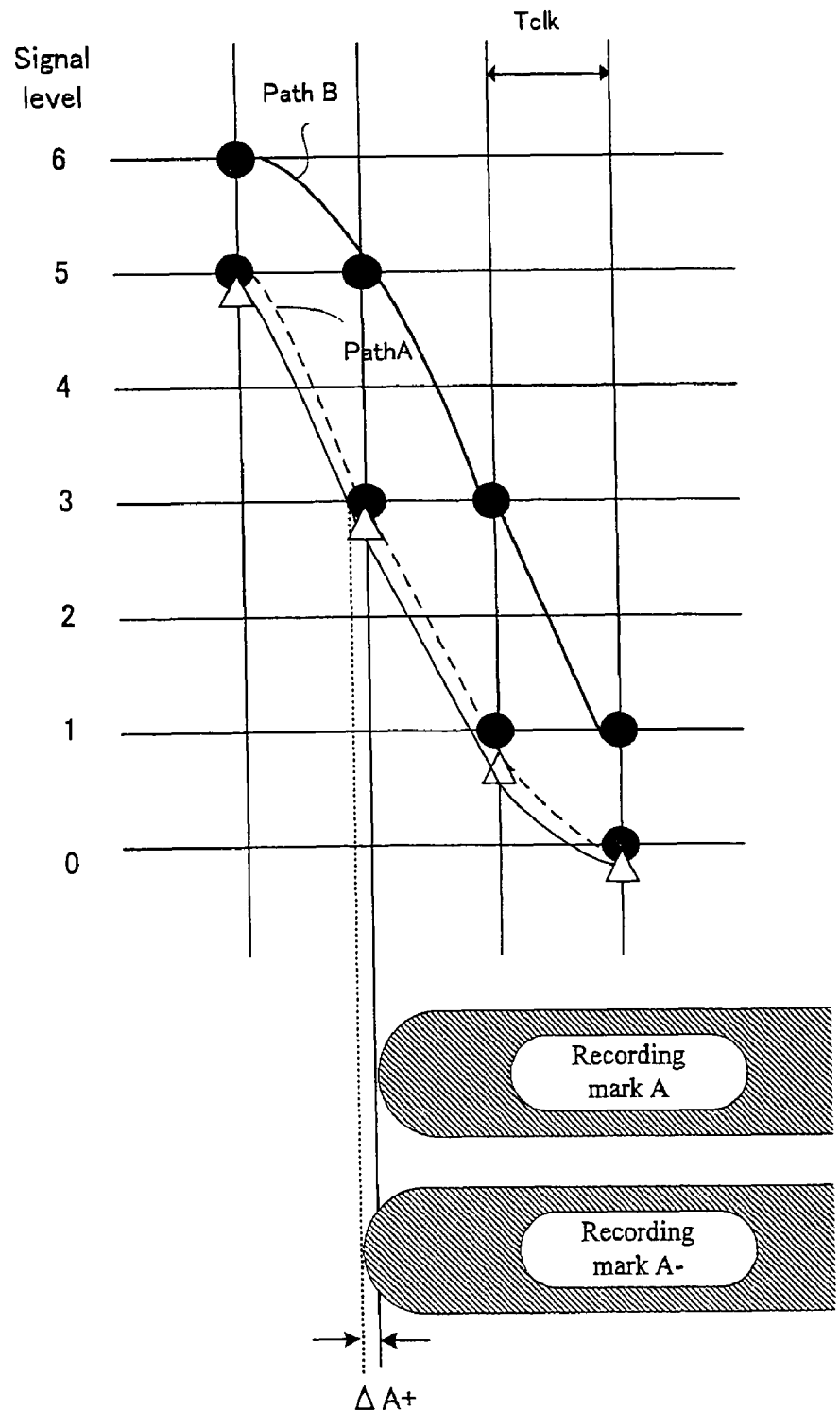
FIG. 2B is a diagram showing a relationship between two paths representing ideal patterns of a reproduction signal which corresponds to a leading edge of a mark and an actual waveform, which is used in the method of detecting edge shift amounts according to an embodiment of the present invention.
Figure 3A:
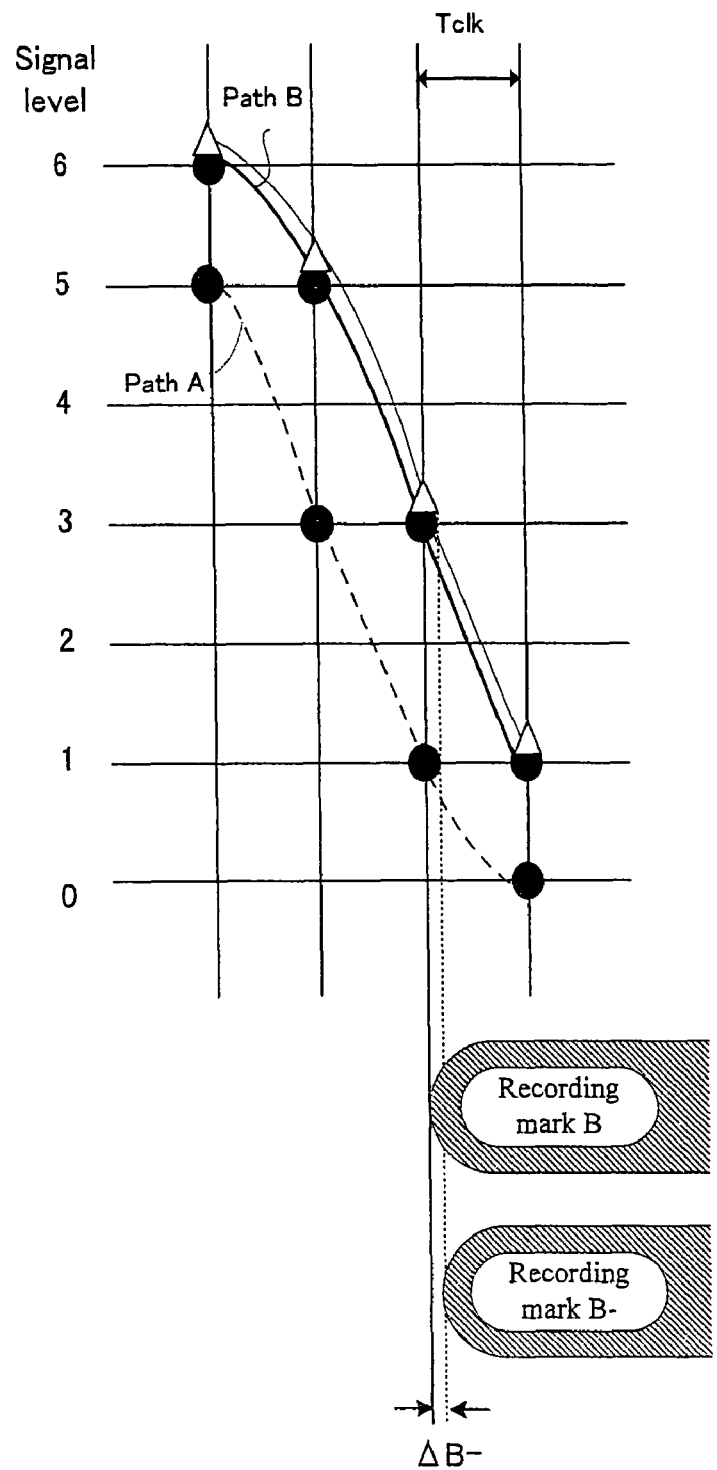
FIG. 3A is a diagram showing a relationship between two paths representing ideal patterns of a reproduction signal which corresponds to a leading edge of a mark and an actual waveform, which is used in the method of detecting edge shift amounts according to an embodiment of the present invention.
Figure 3B:
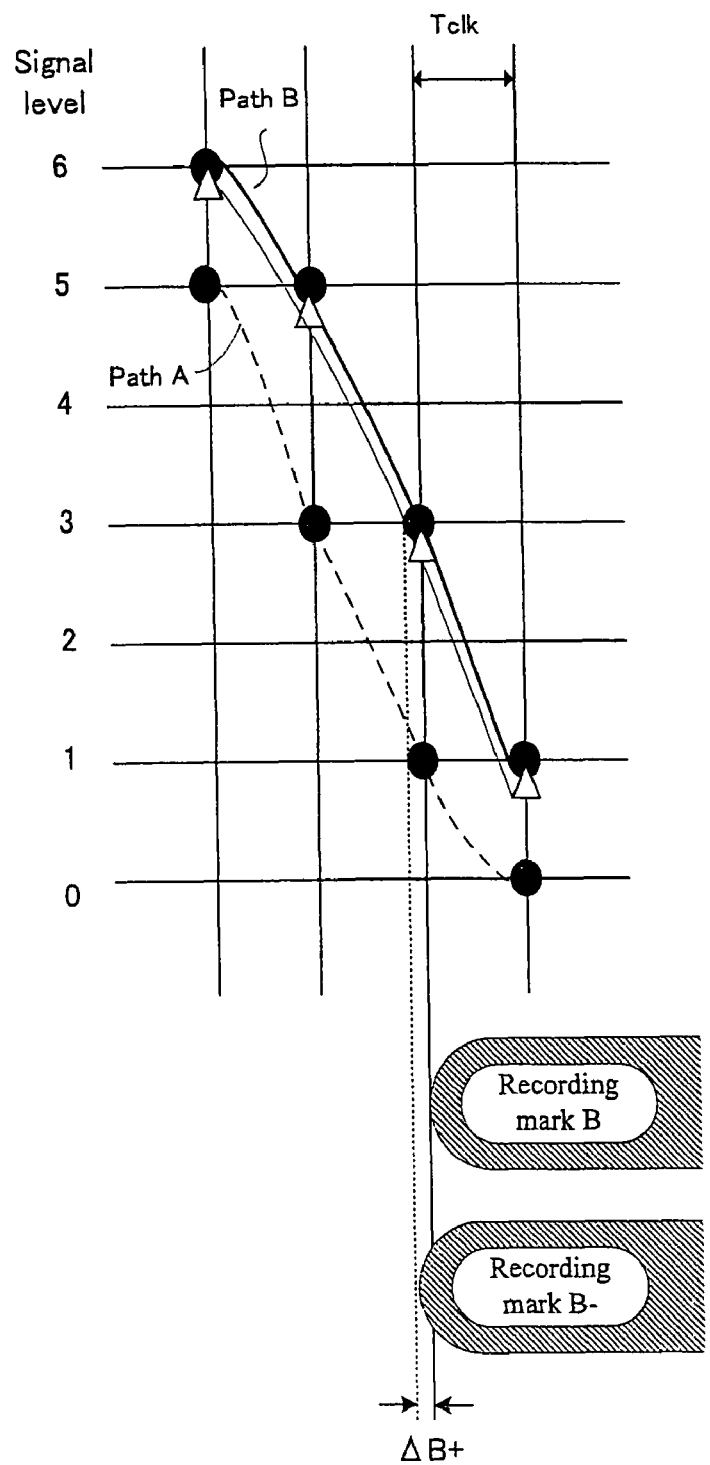
FIG. 3B is a diagram showing a relationship between two paths representing ideal patterns of a reproduction signal which corresponds to a leading edge of a mark and an actual waveform, which is used in the method of detecting edge shift amounts according to an embodiment of the present invention.

The portion of the input signal which corresponds to the leading edge of the 5T mark ideally shows one of two paths A and B included in Pattern-2 (shown by broken lines and bold solid lines in FIGS. 2 and 3). Accordingly, the corresponding portions of the actual input signal should have the shapes similar to one of two paths A and B. In FIGS. 2 and 3, fine solid lines show actual input signals. FIGS. 2A and 2B show an example where path A is a correct answer. The shape of the actual input signal is similar to that of path A. FIGS. 3A and 3B show an example where path B is a correct answer. The shape of the actual input signal is similar to that of path B. In FIGS. 2 and 3, sample values sampled from the actual input signals at channel clock cycle are indicated by triangles. The edge shift detection unit 109 calculates a square sum of differences between the expected values of the samples included in path A (indicated by solid circles in FIG. 2) and actual sample values (triangles) and determine as a distance Pa between the path A and the actual input signal. Similarly, the edge shift detection unit 109 determines a distance Pb between path B and the actual input signal. The edge shift detection unit 109 further compares the two distances Pa and Pb. When the former distance Pa is small, path A is regarded as the correct answer; when the latter distance Pb is smaller, path B is regarded as the correct answer. The group of samples of the actual input signal can be divided into a sample group having path A as the correct answer and a sample group having path B as the correct answer.

The edge shift detection unit 109 subtracts a positive constant, Pstd, from a difference between two paths Pa and Pb, |Pa−Pb| and obtains the value, |Pa−a−Pb|−Pstd. Herein, the positive constant Pstd represents a difference between two distances Pa and Pb when the input signal matches one of two paths A and B. In other words, when one of distances Pa and Pb is equal to 0 (Pa=0, or Pb=0), the difference between two paths Pa and Pb, |Pa−Pb| is equal to positive constant Pstd, |Pa−Pb|=Pstd. When the obtained value |Pa−Pb|−Pstd is a negative value, the waveform of the actual input signal is within a region between two paths A and B. When the obtained value |Pa−Pb|−Pstd is a positive value, the waveform of the actual input signal is out of the region between two paths A and B. Accordingly, an error is less likely to occur in the maximum likelihood decoding when the obtained value |Pa−Pb|−Pstd is a positive value than when it is a negative value. In view of such a characteristic, the edge shift detection unit 109 determines the edge shift amount from the obtained value |Pa−Pb|−Pstd as follows. First, the magnitude of the edge shift amount is defined by the magnitude of the obtained value |Pa−Pb|−Pstd. Next, the sign of the edge shift amount is defined so as to conform to a direction of the shift in the edge position. In the example shown in FIGS. 2 and 3, the sign of the edge shift amount is defined to be positive when the shift in the edge position is in a direction toward left (a direction from the trailing edge toward the leading edge of the mark). The sample group having path A as the correct answer and that having path B as the correct answer have opposite correspondences between the signs of the obtained value |Pa−Pb|−Pstd and the directions of the shift in the edge position. Thus, the sign of the edge shift amount is defined as follows based on the sign of the obtained value |Pa−Pb|−Pstd.

In the example shown in FIG. 2A, the leading edge of the mark A− corresponding to the actual input signal is delayed compared to the leading edge of the ideal mark A. The leading edge of the actual mark A− is shifted from the leading edge of the ideal mark A in the negative direction. In such an example, the waveform of the actual input signal is within the region between two paths A and B. Thus, the obtained value |Pa−Pb|−Pstd is a negative value. Therefore, edge shift amount $5S5M_A=\Delta A-$ between a 5T space and a 5T mark immediately after is defined by the obtained value |Pa−Pb|−Pstd itself:

$$5S5M_A=\Delta A-=|Pa-Pb|-Pstd<0.$$

In the example shown in FIG. 2B, the leading edge of the mark A+ corresponding to the actual input signal is earlier compared to the leading edge of the ideal mark A. The leading edge of the actual mark A+ is shifted from the leading edge of the ideal mark A in the positive direction. In such an example, the waveform of the actual input signal is outside the region between two paths A and B. Thus, the obtained value |Pa−Pb|−Pstd is a positive value. Therefore, edge shift amount $5S5M_A=\Delta A+$ between a 5T space and a 5T mark immediately after is defined by the obtained value |Pa−Pb|−Pstd itself:

$$5S5M_A=\Delta A+=|Pa-Pb|-Pstd>0.$$

In the example shown in FIG. 3A, the leading edge of the mark B− corresponding to the actual input signal is delayed compared to the leading edge of the ideal mark B. The leading edge of the actual mark B− is shifted from the leading edge of the ideal mark B in the negative direction. In such an example, the waveform of the actual input signal is outside the region between two paths A and B. Thus, the obtained value |Pa−Pb|−Pstd is a positive value. Therefore, edge shift amount $5S5M_B=\Delta B-$ between a 5T space and a 5T mark immediately after is defined by the obtained value |Pa−Pb|−Pstd of the reversed sign.

$$5S5M_B=\Delta B-=-[|Pa-Pb|-Pstd]<0.$$

In the example shown in FIG. 3B, the leading edge of the mark B+ corresponding to the actual input signal is earlier compared to the leading edge of the ideal mark B. The leading edge of the actual mark B+ is shifted from the leading edge of the ideal mark B in the positive direction. In such an example, the waveform of the actual input signal is within the region between two paths A and B. Thus, the obtained value |Pa−Pb|−Pstd is a negative value. Therefore, edge shift amount $5S5M_B=\Delta B+$ between a 5T space and a 5T mark immediately after is defined by the obtained value |Pa−Pb|−Pstd of the reversed sign.

$$5S5M_B=\Delta B+=-[|Pa-Pb|-Pstd]>0.$$

Then, the edge shift detection unit 109 compares the paths A and B of Pattern-7 selected by the pattern detection unit 108 with a shape or a portion of the input signal which corresponds to the trailing edge of the 5T mark. As described above, the edge shift amounts $5M5S_A$ and $5M5S_B$ at the trailing edge of the 5T mark are calculated for each of the sample groups having the paths A and B as correct answers. As below the edge shift detection unit 109 further calculates averages of the edge shift amounts at the leading edge and the trailing edge of the 5T mark among two sample groups. The average values are determined as the edge shift values 5S5M and 5M5S at the leading edge the trailing edge of the 5T mark. A difference between the average values is determined as a shift $L_{5T}$ of a length of the 5T mark:

$$5S5M=(5S5M_A+5S5M_B)/2,$$

$$5M5S=(5M5S_A+5M5S_B)/2, \text{ and}$$

$$L_{5T}=5S5M-5M5S.$$

The shift in length, $L_{5T}$, represents an amount of shift from a normal length of the 5T mark, 5T. If the length shift $L_{5T}$ is 0, the 5T mark has the same length as the 5T space. If the length shift $L_{5T}$ has a positive value, the 5T mark is longer than the 5T space. If the length shift $L_{5T}$ has a negative value, the 5T mark is shorter than the 5T space. In other words, if the length shift $L_{5T}$ is large, asymmetry is biased toward the mark; if the length shift $L_{5T}$ is small, asymmetry is biased toward the space.

The length shift $L_{5T}$ is calculated for each of the single patterns recorded on the optical disc 101 by using the recording pulse conditions A, B and C. The edge shift detection unit 109 selects the length shift $L_{5T}$ having the value closest to a predetermined target value from the obtained three values of length shift $L_{5T}$. The target value is preferably target asymmetry information pre-recorded in the disc information pre-recorded area 1003 (see FIG. 10) of the optical disc 101. If the target asymmetry information is not recorded in the disc information pre-recorded area 1003, an initial value pre-stored in the recording and reproduction apparatus (preferably, "0" which indicates that there is no asymmetric state) is set as the above-mentioned target value. If information equivalent to the asymmetry information (for example, β value) is previously recorded in the disc information pre-recorded area 1003 of the optical disc 101, a conversion coefficient for corresponding the value indicated by the information to the length shift $L_{5T}$ may be previously set to the recording and reproducing apparatus. In such a case, the value converted by using the conversion coefficient can be set as the above-mentioned target value.

The edge shift detection unit 109 further selects the recording pulse condition which is used for recording the single pattern corresponding to the selected length shift $L_{5T}$ as an optimal condition. For example, if the length shift $L_{5T}$ obtained from the single pattern recorded using the pulse condition A is closest to 0, the recording pulse condition A is selected as the optimal condition. The same is also true of recording pulse conditions B and C. The values of four parameters related to the mark length of 4T or longer, dTtop=h', Ttop=i', Tlp=j', and dTe=k', are held in the memory as optimal values (see FIG. 5).

However, if the actually measured length shift $L_{5T}$ is deviated from the target value by a predetermined threshold or a longer distance for any of three recording pulse conditions A, B and C, the recording pulse condition is reset and the above-mentioned process is repeated from the second step (trial writing). For example, even when the length shift $L_{5T}$ corresponding to the recording pulse condition C is closest to 0, if the length shift $L_{5T}$ has a positive value larger than the threshold value, the process is repeated. Herein, preferably, the recording pulse condition calculation unit 110 sets the values of the parameters included in the recording pulse condition C instead of those of recording pulse standard condition A as reference values, and generates the remaining two recording pulse conditions as in the first step. After repetition of such a process, when the difference between the actually measured length shift $L_{5T}$ and the target value becomes below the threshold value, the recording pulse condition corresponding to the length shift $L_{5T}$ is selected as the optimal condition.

In the first step, the recording pulse condition calculation unit 110 employs the values of the parameters included in the recording pulse standard condition A as reference values and newly sets two sets of recording conditions B and C by changing the reference values by ±1 unit (see FIG. 4). Besides, when the difference between the recording pulse standard condition previously recorded on the optical disc 101 and the recording and reproducing property of the recording and reproducing apparatus is large, the recording pulse condition calculation unit 110 may modify the reference value not only by ±1 unit but also by ±2 units and may set five sets of recording pulse conditions including the recording pulse standard condition A. More preferably, the recording and reproducing apparatus may use each of the five recording pulse conditions at the second step to perform trial writing of the single pattern onto the recording learning area 1002 of the optical disc 101. In this way, the number of samples of the length shift $L_{5T}$ increases at the third step. Thus, a probability that the optimal recording pulse condition is determined by the trial writing of only once. In this way, the time required for learning recording pulse condition can be further shorted in terms of long marks.

In the method for optimizing the recording pulse condition according to an embodiment of the present invention, the same recording pulse condition is set for marks having the length of 4T or longer (see FIG. 4). Therefore, the above-mentioned single pattern is not limited to a 5T single signal. Any single pattern formed of a mark having a length of 4T or longer and a space having a length of 4T or longer may be used. If a method for modulating the recording signal is 17PP modulation, the central value of the mark length distribution is about 5T. By using the 5T single mark for optimizing the recording pulse conditions, an average value of edge shifts of long marks having the length of 4T or longer can be readily aligned. This is why it is preferable to use the 5T single signal in view of further enhancing the recording quality. Alternatively, instead of the 5T single signal, a single pattern formed of a combination of an 8T mark and an 8T space (hereinafter, simply referred to as 8T single signal) may be used for trial recording. The reproduction waveform of the 5T single signal is similar to a sine waveform. On the other hand, in the 8T signal, basic waves, second harmonics, third harmonics, and fourth harmonics are signal bandwidth. Thus, the reproduction waveform of the 8T single signal has a rectangular shape. The reproduction signal can be adjusted by detecting the waveform of a rectangular shape. For example, when a trailing edge of a mark is over-heated while recording, a portion near the trailing edge of the mark further expands from an appropriate shape. Such expansion can be readily detected from the reproduction waveform of the 8T single signal. Thus, it is expected that the information for compensating the parameters of the recording pulse conditions which are related to the trailing edge of the mark can be readily obtained.

[Fourth Step]

The recording and reproducing apparatus uses not only the parameters related to long marks which are optimized at the third step but also parameters related to 2T marks and 3T marks which are included in the recording pulse standard condition A and generates three new sets of recording pulse conditions D, E, and F (see FIG. 5). Furthermore, each of the new recording pulse conditions D, E, and F are used to perform trial writing of a recording signal having a specific pattern onto the recording condition calibration area 1002 of the optical disc 101 (see FIG. 10).

FIG. 5 shows recording pulse conditions D, E, and F. In the recording pulse condition D, values of the parameters related to 2T marks and 3T marks are equal to values a through g in the recording pulse standard condition A. On the other hand, values of the parameters related to marks having a length of 4T or longer are optimal values obtained at the third step, dTtop=h', Ttop=i', Tlp=j' and dTe=k'. The recording pulse condition calculation unit 110 first sets values a through g of seven parameters related to 2T marks and 3T marks included in the recording pulse condition D as reference values. Next, the recording pulse condition calculation unit 110 increases the reference values a, b, d, and e of the parameters dTtop and Ttop by one unit, and stores them with other reference values c, f, and g as the recording pulse condition E. The recording pulse condition calculation unit 110 further reduces the reference values a and c of two parameters related to 2T marks by one unit and increases the reference values d and g of two parameters related to 3T marks by one unit. The recording pulse condition calculation unit 110 also reduces the reference value f of the parameter Tp related to 3T marks by one unit and stores them with remaining two reference values b and e as the recording pulse condition F.

Figure 7:
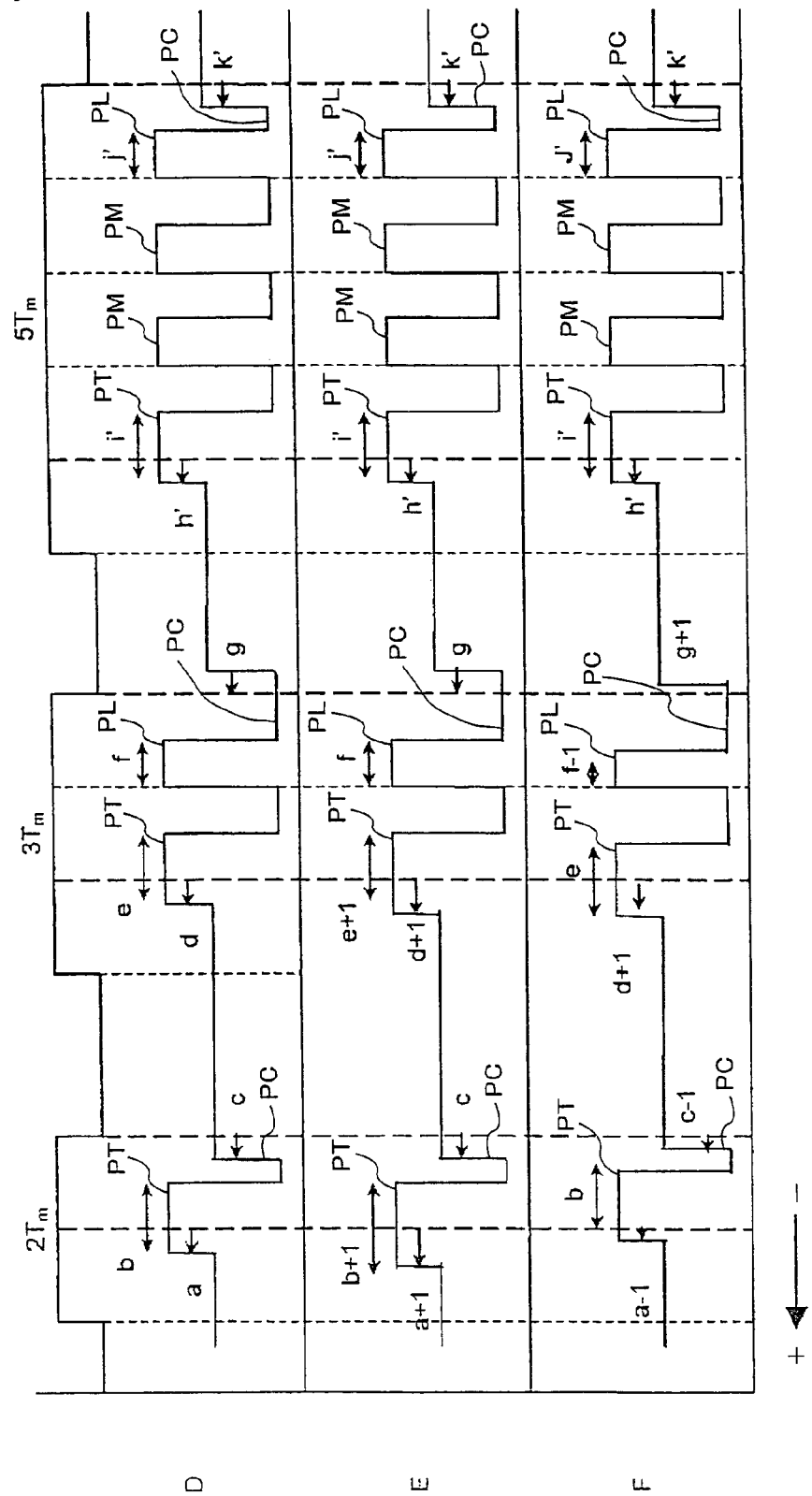
FIG. 7 is a waveform diagram showing correspondence between changes in values of parameters among the recording pulse conditions shown in FIG. 5 and changes in the waveforms of the recording pulses.
Figure 15:
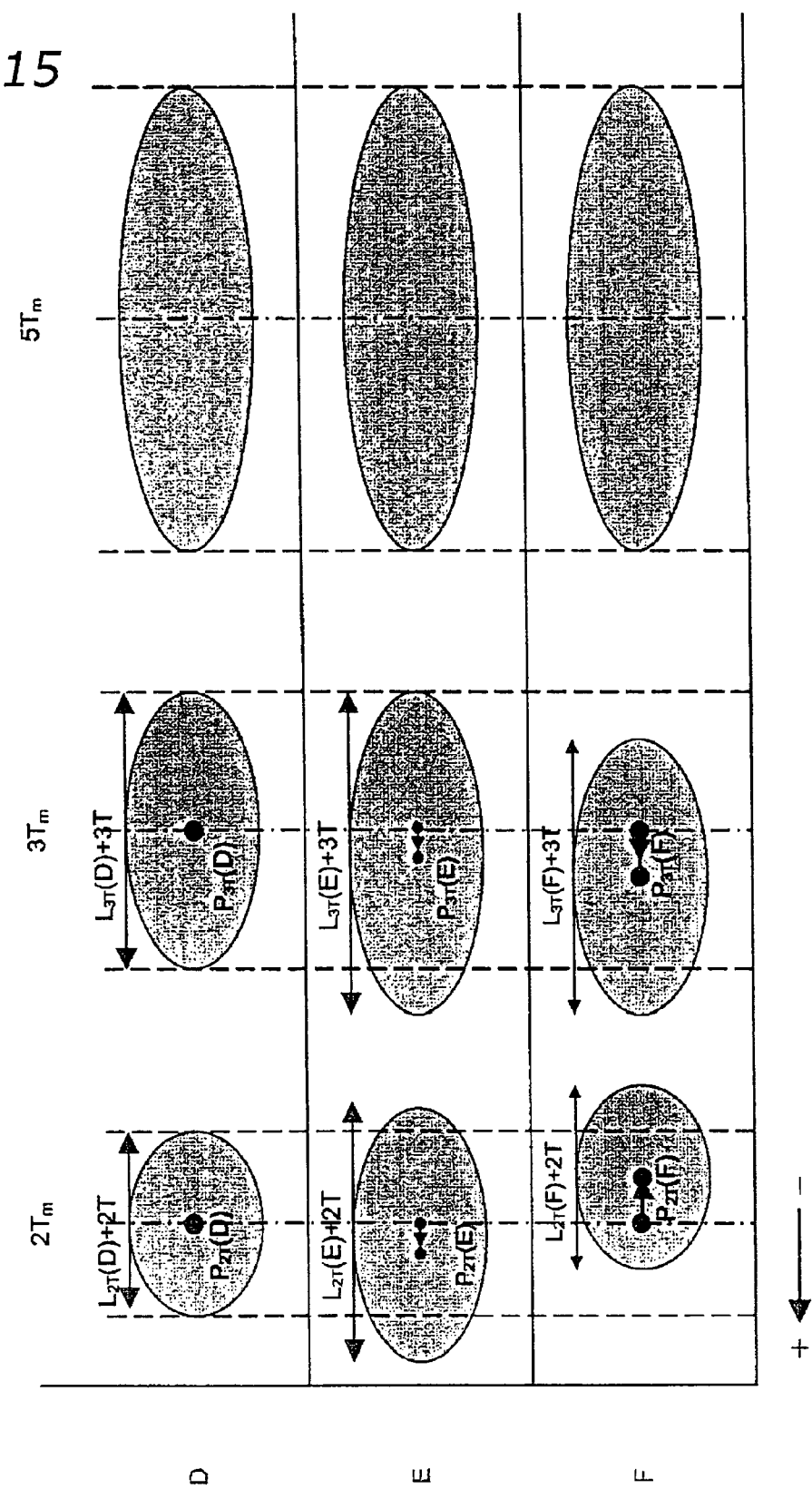
FIG. 15 is a plan view which schematically showing 2T marks, 3T marks, and 5T marks formed on tracks of the optical disc with the recording pulses shown in FIG. 7.

As can be readily seen from FIGS. 7 and 15, in the recording pulse condition E, widths of first pulses PT included in recording pulses corresponding to a 2T mark 2Tm and a 3T mark 3Tm are expanded compared to those in the recording pulse condition D. And the rising positions come earlier (they are shifted toward the left side in FIG. 7). Therefore, in the recording pulse condition E, the leading edges of the 2T mark 2Tm and the 3T mark 3Tm come earlier than in the recording pulse condition D and the marks extend more (see FIG. 15). The recording pulse condition E is set mainly for adjusting mark lengths. In this example, a central phase $P_{2T}(E)$ of the 2T mark 2Tm is changed in the same direction as a central phase $P_{3T}(E)$ of the 3T mark 3Tm. On the other hand, in the recording pulse condition F, the first pulse PT and a cooling pulse PC included in a portion of the recording pulse which corresponds to the 2T mark 2Tm have phases delayed compared to those in the recording pulse condition D (they are shifted toward the right side in FIG. 7). Furthermore, in portion of the recording pulse which corresponds to the 3T mark 3Tm, a phase of the first pulse PT advances, a width of the last pulse PL is reduced, and a phase of the cooling pulse PC advances (they are shifted toward the left side in FIG. 7). Therefore, in the recording pulse condition F, the phase of the 2T mark 2Tm is delayed and the phase of the 3T mark 3Tm advances compared to those in the recording pulse condition D (see FIG. 15). The recording pulse condition F is set mainly for adjusting phases of marks. Particularly, the central phase $P_{2T}(F)$ of the 2T mark 2Tm is changed in the opposite direction to the central phase $P_{3T}(F)$ of the 3T mark 3Tm.

The phases $P_{2T}(E)$ and $P_{3T}(E)$ of the 2T mark 2Tm and the 3T mark 3Tm recorded on the optical disc 101 using the recording pulse condition E change in the same direction as the phases $P_{2T}(D)$ and $P_{3T}(D)$ of the marks recorded with the recording pulse condition D (see FIG. 15). Therefore, generally, there is a phase difference in reproduction clocks obtained by the PLL unit 107 (see FIG. 1) between signals reproduced from the marks recorded respectively using the recording pulse conditions D and E. In such a case a shift in the phase of the 2T mark 2Tm is included as an error in measuring edge shift amount of the 3T mark. On the contrary, the shift in the phase of 3T mark 3Tm is included as an error of measuring the edge shift amount of the 2T mark. When the error is too large, the edge shift amounts cannot be measured correctly. On the other hand, in the recording pulse condition F, the phase $P_{2T}(F)$ of the 2T mark 2Tm changes in the opposite direction as the phase $P_{3T}(F)$ of the 3T mark 3Tm. Thus, the influence of the reproduction clock on the phase is cancelled. Therefore, the phase difference of the general clock is generally small in signals reproduced from the marks recorded using two recording pulse conditions D and F. As a result, the error in measuring the edge shift amount can be further reduced. In the recording pulse condition E, the leading edges may be changed in the opposite directions between the 2T mark and the 3T mark as in the recording pulse condition F. The phases $P_{2T}(E)$ and $P_{3T}(E)$ of the 2T mark 2Tm and the 3T mark 3Tm may be changed in the opposite direction as the phases $P_{2T}(D)$ and $P_{3T}(D)$ of the marks recorded with the recording pulse condition D. In this way, the error in measuring the edge shift amount may be reduced as in the recording pulse condition F.

A method for setting the recording pulse condition E may be different from the method mentioned above (see FIGS. 5 and 7). For example, for moving the leading edge of the mark, the position of the first pulse dTtop may be changed (by one unit, for example) with the width Ttop of the first pulse being fixed. Alternatively, the position of the first pulse Ttop may be changed (by one unit, for example) with the rising position dTtop of the first pulse being fixed. Furthermore, for moving the trailing edge of the mark, the width of the last pulse Tlp may be changed by one unit, for example, or the rising position of the cooling pulse dTe may be changed by one unit, for example. When the rising position dTtop and the width Ttop of the first pulse are changed at the same time as in the setting method as described above, the rear end of the first pulse does not overlap the front end of the following pulse (a middle pulse or the last pulse) since the falling position of the first pulse is fixed. The space between the first pulse and the following pulse does not become too small. Therefore, a correct waveform of the recording pulse can be obtained. Particularly, for high-speed recording of BD double speed or faster, it is desirable that at least 2 ns is secured between the recording pulses in order to avoid distortion in the pulse waveform of the laser light caused by the response speed of the laser.

A method for setting the recording pulse condition F may be different from the method mentioned above (see FIGS. 5 and 7). For example, the phase of the last pulse may be changed with the width Tlp of the last pulse being fixed. In this way, an amount of change in the length of the 3T mark, $L_{3T}(F)$, may be suppressed (see FIG. 15). Thus, the interference between the mark length and the phase is reduced, and the amount of change in the phase $P_{3T}(F)$ (see FIG. 15) can be detected more precisely.

In the recording patterns which are to be used in the trial writing with the recording pulse conditions D, E, and F, the frequencies of the appearances of code lengths from 2T to 8T are almost equal, and also digital sum value (DSV) control is performed. Thus, they are different from conventional recording patterns. The conventional recording patterns are modulated by the 17PP modulation method in the same way as the user data. Thus, in the conventional recording pattern, the appearance probability of 2T marks is about 38%, while the appearance probability of 3T marks is about 25% and the appearance probability of 4T marks is about 16%. The appearance probability of long marks having a length of 5T or longer is further lower. The appearance frequency of the code length decreases as the code lengths increases. When the recording pattern having different appearance frequencies for different code lengths are used for the trial writing as described above, the phase of the reproduction clock obtained by the PLL unit 107 from the recording pattern written onto the optical disc 101 is determined based mostly on the phase of the short marks of a high appearance frequency (particularly, 2T marks having the appearance possibility of ⅓ or higher). However, as described above, the edge positions of short marks largely vary among the recording pulse conditions D, E and F. Thus, the phase of the reproduction clock obtained from the conventional recording pattern largely varies. As a result, the edge shift amount and/or phase measured from the long marks having a length of 4T or longer (which has already small edge shift amount by the third step) include a significant error. Such an error prohibits measurement of the edge shift amount of short marks with a high accuracy to be performed at the fifth step. On the contrary, the recording pattern used at the fourth step has appearance frequency substantially equal for all the code lengths. This means that the appearance probability for the 2T marks and the 3T marks are respectively ⅐ while the frequency that any of the marks having a length of 4T or longer is ⅝. Thus, most of the marks in the recording pattern used at the fourth step are the long marks having a length of 4T or longer. In such a case, the phase of the reproduction clock obtained by the PLL unit 107 from the recording pattern written onto the optical disc 101 is determined based mostly on the phase of the long marks. As a result, the phase of the reproduction clock is stable irrespective of changes in the edge position of the 2T marks and the 3T marks. Thus, the edge shift amount of the 2T marks and 3T marks can be measured with a high accuracy at the fifth step.

The recording and reproducing apparatus uses the recording pulse conditions D, E and F, respectively, to perform trial writing of the recording pattern mentioned above onto the recording condition calibration area 1002 of the optical disc 101 (see FIG. 10) as in the second step. This means that the above-mentioned recording patterns are recorded on the recording condition calibration area 1002 sequentially for the recording pulse conditions D, E, and F, respectively.

Preferably, when the edge position of the 4T mark is remote from the average edge position of the mark having a length of 5T or longer, the parameters of the recording pulse condition related to the 4T mark may be changed and trial recording may be performed similarly to the parameters related to the 3T marks. In the process of the fifth step and the following steps, the edge shift amount is measured not only for short marks but also for the 4T marks, and the parameters related to the 4T marks are compensated based on the measured result.

For setting the recording pulse conditions E and F, amounts of changes in the parameters dTtop, Ttop, Tlp, and dTe may not only be equal to the minimum unit which can be set by the recording and reproducing apparatus, but also be twice as large as or larger than the unit. In such a case, the edge shift amount when the parameter is changed by one unit is converted from the edge shift amount measured at the fifth step. In this way, the edge shift amount when the parameter is changed by one unit can be measured accurately even with an optical disc which experiences only a small amount of edge shift when the recording pulse condition is changed.

[Fifth Step]

As described below, the recording and reproducing apparatus reproduces the recording patterns sequentially from tracks on which the above mentioned recording pattern is recorded with the recording pulse conditions D, E and F and measures the edge shift amounts of the reproduction signals.

First, the reproduction signal output from the light irradiation unit 102 is processed at the preamplifier unit 103, the AGC unit 104, the waveform equalization unit 105, and the A/D conversion unit 106 in turn, and is converted into a digitized signal by the maximum likelihood decoding unit in the pattern detection unit 108. Next, the pattern detection unit 108 measures the edge shift amount of the reproduction signal based on the digitized signal. In this example, it is assumed that the maximum likelihood decoding unit conforms to the PR (1, 2, 2, 1) method.

The fundamental principle of measurement of the edge shift amount is as described in the description of the third step. A difference in the fifth step from the third step is the pattern selected by the pattern detection unit 108 (see FIGS. 8 and 9). Following the classification shown in FIG. 9, the pattern detection unit 108 uses Pattern-3 and Pattern-4 for detecting the leading edge of a 2T mark, Pattern-6 and Pattern-8 for detecting a trailing edge of a 2T mark, Pattern-1 through Pattern-4 for detecting a leading edge of a 3T mark, and Pattern-5 through Pattern-8 for detecting a trailing edge of a 3T mark. More specifically, for detecting a leading edge of a 3T mark following a 2T space, path P3A of Pattern-3 is selected. For detecting a leading edge of a 3T mark following a 3T space, path P1B of Pattern-1 and path P4A of Pattern-4 are selected. As can be seen from the classification shown in FIG. 9, there is only one candidate for a correct path in patterns including any of 2T marks and 2T spaces. On the other hand in a pattern which does not include any of 2T marks and 2T spaces, there are always two candidates for correct paths. In the step below, the parameters of the recording pulse condition are optimized such that portions of the reproduction signal corresponding to a leading end and a trailing end of the mark become closer to paths shown in FIG. 9 for any of combinations between the mark lengths and the space lengths. Such parameters are optimal for data reproduction by the maximum likelihood decoding.

In FIG. 9, a path is not set for any of a pattern including a 2T mark immediately after a 2T space and a pattern including a 2T space immediately after a 2T mark. These patterns cannot be detected with the eight patterns (Pattern-1 through Pattern-8) shown in FIG. 8. Thus, a method different from the method below may be used for measuring the edge shift amount for those patterns. In the data reproduction using the maximum likelihood decoding, those patterns tend to be detected erroneously as a pattern having a code length of 1T which is not used for 17PP modulation. However, errors caused by such patterns can be readily identified. Thus, the recording pulse condition does not have to be optimized for each of the optical discs 101 in terms of those patterns, and a suitable initial value may be used uniformly.

Next, similarly to the third step, the edge shift detection unit 109 measures the edge shift amount of the 2T marks and 3T marks. For example, regarding the leading edge of the 3T mark, the edge shift detection unit 109 measures the edge shift amount as described below for each of four candidates P3A, P1B, P4A, and P2B for correct paths selected by the pattern detection unit 108. When there is a 4T space immediately before a 3T mark, the pattern detection unit 108 selects path P2B of Pattern-2 and path P4A of the Pattern-4 (see FIGS. 8 and 9). The edge shift detection unit 109 compares waveforms of the corresponding portions of the input signal to the maximum likelihood decoding unit with the paths P2B and P4A and calculates the edge shift amounts $4S3M_B$ and $4S3M_A$ for the sample groups having the paths P2B and P4A as correct answers based on the distances between them. The edge shift detection unit 109 further calculates the average of two edge shift amounts $4S3M_B$ and $4S3M_A$ and determines the average value as the edge shift amount 4S3M where there is a 4T space immediately before a 3T mark:

$$4S3M=(4S3M_B+4S3M_A)/2.$$

Similarly, when there is a space having a length of 5T or longer immediately before a 3T mark, waveforms of the corresponding portions of the input signal are compared with the paths P2B and P4A and the edge shift amounts $5S3M_B$ and $5S3M_A$ are calculated for the sample groups having the paths P2B and P4A as correct answers based on the distances between them. The average value between them is determined as the edge shift amount 5S3M where there is a space having a length of 5T or longer is immediately before a 3T mark. The patterns shown in FIGS. 8 and 9 are compared with the waveforms of the corresponding portions of the input signal for each length of the space immediately before a 3T mark to measure the edge shift amount. The edge shift amount is shown in FIG. 11 for each of combinations between mark lengths and space lengths. For combinations having two candidates for the correct path (PXA, PYB (X, Y=1, 2, ..., 8)), variables shown in FIG. 11 represent average values of the edge shift amounts among sample groups having the paths PXA and PYB as correct answers.

The edge shift detection unit 109 further calculates the average edge shift amount for each of the mark lengths regardless of the length of the spaces on the front and back side from the edge shift amounts obtained from the combinations of the mark lengths and space lengths. For example, the average edge shift amount xS3M of the leading edge of a 3T mark can be obtained by the following expression:

$$xS3m=(C_{2S3M}*2S3M+C_{3S3M}*3S3M+C_{4S3M}*4S3M+C_{5S3M}*5S3M)/(C_{2S3M}+C_{3S3M}+C_{4S3M}+C_{5S3M}).$$

Herein, four constants $C_{iS3M}$ (i=2, 3, 4, 5) represents the number of samples of combinations between iT spaces and a 3T mark immediately after it, which is utilized for measuring the edge shift amount. For the marks of different lengths, the edge shift amounts for different lengths of the space immediately before are averaged with being weighted in accordance with the number of the samples mentioned above to obtain the average edge shift amounts of the leading edges of the marks. In this way, the edge shift detection unit 109 obtains average edge shift amounts xS2M and xS3M of the leading edges and average edge shift amounts 2MxS and 3MxS of trailing edges respectively for 2T marks and 3T marks through calculation.

[Sixth Step]

The recording pulse condition calculation unit 110 first uses the average edge shift amount measured by the edge shift detection unit 109 to obtain length shifts $L_{2T}$ and $L_{3T}$ and phase shifts $P_{2T}$ and $P_{3T}$ for each of the 2T marks and the 3T marks for recording pulse conditions D, E and F from the following expressions:

$$L_{2T}=xS2M-2MxS;$$

$$L_{3T}=xS3M-3MxS;$$

$$P_{2T}=xS2M+2MxS; \text{ and}$$

$$P_{3T}=xS3M+3MxS.$$

Herein, the length shift $L_{iT}$ (i=2, 3) refers to a difference between a length of an iT mark actually recorded on the optical disc 101 and a normal length (i multiple of reproduction clock cycle T=iT). When length shift $L_{iT}$ is 0, the actual length of an iT mark matches the normal length. When length shift $L_{iT}$ has a positive value, the actual length of an iT mark is longer than the normal length; when length shift $L_{iT}$ has a negative value, the actual length of an iT mark is shorter than the normal length. Meanwhile, the phase shift $P_{iT}$ (i=2, 3) refers to a difference between a phase of an iT mark actually recorded on the optical disc 101 and a normal phase (phase of reproduction clock). When phase shift $P_{iT}$ is 0, the actual phase of an iT mark matches the phase. When phase shift $P_{iT}$ has a positive value, the actual phase of an iT mark advances from the normal phase; when phase shift **$L_{iT}$ has a negative value, the actual phase of an iT mark is delayed from the normal phase.

Next, the recording pulse condition calculation unit 110 compares the length shifts $L_{2T}$ and $L_{3T}$ and phase shifts $P_{2T}$ and $P_{3T}$ from the 2T marks and the 3T marks with the predetermined threshold values for a signal generated by reproducing the recording pattern recorded using the recording pulse condition D. If the length shifts $L_{2T}$ and $L_{3T}$ and phase shifts $P_{2T}$ and $P_{3T}$ all do not exceed the threshold values, the recording pulse condition calculation unit 110 determines the recording pulse condition D as the optimal recording pulse condition and finishes the optimizing process for recording pulse conditions. Alternatively, when the compensation values m and n to be obtained at the seventh step which will be described below both become zero, the recording pulse condition calculation unit 110 finishes the optimizing process for the recording pulse condition. On the other hand, when any of the length shifts $L_{2T}$ and $L_{3T}$ and phase shifts $P_{2T}$ and $P_{3T}$ exceeds the threshold value, the recording pulse condition calculation unit 110 continues the process of the seventh step and the following steps to perform compensations of the recording pulse conditions. As an indicator for this determination, besides the length shifts $L_{2T}$ and $L_{3T}$ and phase shifts $P_{2T}$ and $P_{3T}$, the square sum thereof, jitters of the reproduction signal, or a combination of any other indicators representing the quality of the reproduction signal (for example, MLSE, bER, and SER) may be used.

[Seventh Step]

The recording pulse condition calculation unit 110 calculates a compensated value of the recording pulse condition based on the length shifts $L_{2T}$ and $L_{3T}$ and phase shifts $P_{2T}$ and $P_{3T}$ of the 2T marks and the 3T marks obtained for each of the recording pulse conditions D, E, and F. For the calculation, the following parameters are used:

Length shifts $L_{2T}(D)$, $L_{3T}(D)$, $L_{2T}(E)$, $L_{3T}(E)$, $L_{2T}(F)$ and $L_{3T}(F)$, and phase shifts $P_{2T}(D)$, $P_{3T}(D)$, $P_{2T}(E)$, $P_{3T}(E)$, $P_{2T}(F)$ and $P_{3T}(F)$ for each of the recording pulse conditions D, E, and F;

Differences in length shifts $L12_{21}$ and $L12_{3T}$ and differences in phase shifts $P12_{2T}$ and $P12_{3T}$ between the recording pulse condition D, which is the reference, and the recording pulse condition E for adjusting mark lengths;

Differences in length shifts $L13_{2T}$ and $L13_{3T}$ and differences in phase shifts $P13_{2T}$ and $P13_{3T}$ between the recording pulse condition D, which is the reference, and the recording pulse condition F for adjusting mark phase; and Compensation amounts of mark lengths $m_{2T}$ and $m_{3T}$ and compensation amounts of mark phases $n_{2T}$ and $n_{3T}$ (preferably, $m_{2T}$, $m_{3T}$, $n_{2T}$ and $n_{3T}$ are all represented by integral multiples of units of parameters of the recording pulse conditions).

The recording pulse condition calculation unit 110 calculates the differences in length shifts, $L12_{2T}$, $L12_{3T}$, $L13_{2T}$ and $L13_{3T}$, and differences in phase shifts, $P12_{2T}$, $P12_{3T}$, $P13_{2T}$ and $P13_{3T}$, as follows. First, the recording pulse condition calculation unit 110 calculates a difference between length shifts $L_{2T}(D)$ and $L_{2T}(E)$ and a difference between $L_{3T}(D)$ and $L_{3T}(E)$ of the recording pulse conditions D and E as the length shift differences $L12_{2T}$ and $L12_{3T}$ of the recording pulse conditions D and E based on the following expressions:

$$L12_{2T}=L_{2T}(E)-L_{2T}(D); \text{ and}$$

$$L12_{3T}=L_{3T}(E)-L_{3T}(D).$$

Next, the recording pulse condition calculation unit 110 calculates a difference between phase shifts $P_{2T}(D)$ and $P_{2T}(E)$ and a difference between $P_{3T}(D)$ and $P_{3T}(E)$ of the recording pulse conditions D and E as the phase shift differences $P12_{2T}$ and $P12_{3T}$ of the recording pulse conditions D and E based on the following expressions:

$$P12_{2T}=P_{2T}(E)-P_{2T}(D); \text{ and}$$

$$P12_{3T}=P_{3T}(E)-P_{3T}(D).$$

Then, the recording pulse condition calculation unit 110 calculates a difference between length shifts $L_{2T}(D)$ and $L_{2T}(F)$ and a difference between $L_{3T}(D)$ and $L_{3T}(F)$ of the recording pulse conditions D and F as the length shift differences $L13_{2T}$ and $L13_{3T}$ of the recording pulse conditions D and F based on the following expressions:

$$L13_{2T}=[L_{2T}(F)-L_{2T}(D)]; \text{ and}$$

$$L13_{3T}=L_{3T}(F)-L_{3T}(D).$$

Further, the recording pulse condition calculation unit 110 calculates a difference between phase shifts $P_{2T}(D)$ and $P_{2T}(F)$ and a difference between $P_{3T}(D)$ and $P_{3T}(F)$ of the recording pulse conditions D and F as the phase shift differences $P13_{2T}$ and $P13_{3T}$ of the recording pulse conditions D and F based on the following expressions:

$$P13_2=-[P_{2T}(F)-P_{2T}(D)]; \text{ and}$$

$$P13_{3T}=P_{3T}(F)-P_{3T}(D).$$

The recording pulse condition calculation unit 110 calculates compensation amounts mx and nx required for changing the length shift Lx and the phase shift Px, of which the edge shift amount is the smallest among the recording pulse conditions D, E, and F (in this example, recording pulse condition D), respectively to the target value, 0, based on length shift differences L12x and L13x [x=2T, 3T] and phase shift differences P12x and P13x by linear simultaneous equations (1) through (4) (hereinafter, referred to as shift compensation equations):

$$L_{2T}+L12_{2T}*m_{2T}+L13_{2T}*n_{2T}=0; \tag{1}$$

$$P_{2T}+P12_{2T}*m_{2T}+P13_{2T}*n_{2T}=0; \tag{2}$$

$$L_{3T}+L12_{3T}*m_{3T}+L13_{3T}*n_{3T}=0; \text{ and} \tag{3}$$

$$P_{3T}+P12_{3T}*m_{3T}+P13_{3T}*n_{3T}=0. \tag{4}$$

The shift compensation equations (1) through (4) have the meaning as described below. As set at the fourth step, the recording pulse condition E has values of parameters dTtop and Ttop different from those of the recording pulse condition D by ±1 unit (see FIGS. 5 and 7). Therefore, the length shift difference L12x and the phase shift difference P12x between the recording pulse conditions D and E are generated due to changes in the parameters dTtop and Ttop by ±1 unit. In this example, it is assumed that a length shift change and a phase shift change accompanied with changes in the parameters dTtop and Ttop are both proportional to the changes of the parameters dTtop and Ttop (linear approximation). This assumption leads to the following: if data is recorded with the recording pulse condition such that reference values a and b of the parameters dTtop and Ttop are changed by compensation amount $m_{2T}$ and reference values d and e are changed by the compensation amount $m_{3T}$, in a signal when such a recording pattern is reproduced, a length shift is changed from the length shift Lx with the recording pulse condition D by a product of the length shift difference between recording pulse conditions D and E, L12x and compensation amount mx, and a phase shift is changed from phase shift Px with the recording pulse condition D by a product of the length shift difference between recording pulse conditions D and E, P12x and compensation amount mx.

The recording pulse condition F has values of parameters dTtop and dTe related to 2T marks different from those of the recording pulse condition D by −1 unit, values of parameters dTtop and dTe related to 3T marks different from those or the recording pulse condition D by +1 unit, and value of parameters Tlp related to 3T marks different from that of the recording pulse condition D by −1 unit (see FIGS. 5 and 7). The length shift difference L13x and the phase shift difference P13x between the recording pulse conditions D and F are generated due to changes in the parameters dTtop, Tlp and dTe by ±1 unit. In this example, it is assumed that a length shift change and a phase shift change accompanied with changes in the parameters dTtop, Tlp and dTe are both proportional to the changes of the parameters dTtop, Tlp and dTe (linear approximation). This assumption leads to the following: if n data is recorded with the recording pulse condition such that reference values a, c, d, f, and g of the parameters dTtop, Tlp and dTe are changed by $−n_{2T}$, $−n_{2T}$, $n_{3T}$, $−n_{3T}$, and $n_{3T}$, in a signal when such a recording pattern is reproduced, a length shift is changed from the length shift Lx with the recording pulse condition D by a product of the length shift difference between recording pulse conditions D and F, L13x and compensation amount nx, and a phase shift is changed from phase shift Px with the recording pulse condition D by a product of the length shift difference between recording pulse conditions D and F, P13x and compensation amount nx.

Therefore, if data is recorded with the recording pulse condition having values of parameters changed from the reference values by using compensation amount mx and nx which satisfy the shift compensation equations (1) through (4) simultaneously, in a signal when such a recording pattern is reproduced, both a length shift and a phase shift match the target value, 0.

The recording pulse condition E is set mainly for adjusting mark lengths; the recording pulse condition F is set mainly for adjusting mark lengths. However, in a signal when a pattern recorded with the recording pulse condition E is reproduced, not only the mark length shift Lx but also phase shift Px of the mark is changed. Contrary, in a signal when a pattern recorded with the recording pulse condition F is reproduced, not only mark phase shift Px, but also mark length shift Lx is changed. Changes in the mark lengths and changes in mark phases accompanied with changes in the recording pulse condition are dependent on each other rather than being independent. The relationship among them are made to become approximate to linear shape by the shift compensation equations (1) through (4), amounts of compensation from measured values of the length shifts differences L12x and L13x and phase shift differences P12x and P13x, which are required for optimizing the recording pulse condition, can be determined by calculation. The compensation amount mx and nx are preferably calculated from the following equations (5) through (8), which are obtained from the shift compensation equations (1) through (4):

$$m_{2T}=(P_{2T}*L13_{2T}-L_{2T}*P13_{2T})/(L12_{2T}*P13_{2T}-P12_{2T}*L13_{2T}) \quad (5)$$

$$n_{2T}=(L_{2T}*L12_{2T}-P_{2T}*L12_{2T})/(L12_{2T}*P13_{2T}-P12_{2T}*L13_{2T}); \quad (6)$$

$$m_{3T}=(P_{3T}*L13_{3T}-L_{3T}*P13_{3T})/(L12_{3T}*P13_{3T}-P12_{3T}*L13_{3T}); \text{ and} \quad (7)$$

$$n_{3T}=(L_{3T}*L12_{3T}-P_{3T}*L12_{3T})/(L12_{3T}*P13_{3T}-P12_{3T}*L13_{3T}). \quad (8)$$

The compensation amounts mx and nx obtained from equations (5) through (8) are further rounded off to whole numbers preferably from first decimal places. The obtained compensation amounts mx and nx are used and the recording pulse condition calculation unit 110 compensates the recording pulse condition as follows (see FIG. 12). The recording pulse condition calculation unit 110 first increases the reference values a and b of the parameters dTtop and Ttop related to 2T marks by the compensation amount $m_{2T}$ of mark lengths. Then, the recording pulse condition calculation unit 110 increases the reference values a and c of the parameters dTtop and dTe by compensation amount $n_{2T}$ of mark phases:

$$2T{:}dT\text{top}=a+m_{2T}+n_{2T};$$

$$2T{:}T\text{top}=b+m_{2T}; \text{ and}$$

$$2T{:}dTe=c+n_{2T}.$$

Next, the recording pulse condition calculation unit 110 compensates the reference values d, e, f and g of the parameters dTtop, Ttop, Tlp, and dTe by using compensation amounts $m_{3T}$ and $n_{3T}$ regarding 3T marks as indicated by the following equations:

$$3T{:}dT\text{top}=d+m_{3T}+n_{3T};$$

$$3T{:}T\text{top}=e+m_{3T};$$

$$3T{:}Tlp=f-m_{3T}; \text{ and}$$

$$3T{:}dTe=g+n_{3T}.$$

The recording pulse condition calculation unit 110 replaces the recording pulse condition D with the recording pulse condition G obtained by the above compensation as a initial condition. Thus, if it is determined that the process from the fourth step has been repeated at the eighth step described below, the values of the parameters in the recording pulse condition G are set as the reference values instead of the recording pulse condition D at the fourth stop in next turn.

In the shift compensation equations (1) through (4), the target value for the length shifts and the phase shift is uniformly set to zero. In this way, the recording pulse condition is optimized such that a rate of occurrence of errors in the maximum likelihood decoding process is minimized. When it is desired to strike a preferable balance between the rate of occurrence of errors in the maximum likelihood decoding process and other indicators representing the quality of the reproduction signal (for example, jitters, jitters after limit equalizer, and the like), the target value may be set as a value different from 0, and a different value may be set for the 2T marks and the 3T marks. When the target values of the length shifts and the phase shifts are respectively Ltx and Ptx (x=2T, 3T), the shift compensation equations are represented by the following simultaneous equations (9) through (12) and the solutions thereof are represented by equations (13) through (16):

$$L_{2T} + Lt_{2T} + L12_{2T} * m_{2T} + L13_{2T} * n_{2T} = 0; \quad (9)$$

$$P_{2T} + Pt_{2T} + P12_{2T} * m_{2T} + P13_{2T} * n_{2T} = 0; \quad (10)$$

$$L_{3T} + Lt_{3T} + L12_{3T} * m_{3T} + L13_{3T} * n_{3T} = 0; \quad (11)$$
and $$P_{3T} + Pt_{3T} + P12_{3T} * m_{3T} + P13_{3T} * n_{3T} = 0. \quad (12)$$

$$m_{2T} = \frac{\left(\frac{P_{2T}*L13_{2T}-}{L_{2T}*P13_{2T}}\right)}{\left(\frac{L12_{2T}*P13_{2T}-}{P12_{2T}*L13_{2T}}\right)} + \frac{\left(\frac{Pt_{2T}*L13_{2T}-}{Lt_{2T}*P13_{2T}}\right)}{\left(\frac{L12_{2T}*P13_{2T}-}{P12_{2T}*L13_{2T}}\right)}; \quad (13)$$

$$n_{2T} = \frac{\left(\frac{L_{2T}*P12_{2T}-}{P_{2T}*L12_{2T}}\right)}{\left(\frac{L12_{2T}*P13_{2T}-}{P12_{2T}*L13_{2T}}\right)} + \frac{\left(\frac{Lt_{2T}*P12_{2T}-}{Pt_{2T}*L12_{2T}}\right)}{\left(\frac{L12_{2T}*P13_{2T}-}{P12_{2T}*L13_{2T}}\right)}; \quad (14)$$

$$m_{3T} = \frac{\left(\frac{P_{3T}*L13_{3T}-}{L_{3T}*P13_{3T}}\right)}{\left(\frac{L12_{3T}*P13_{3T}-}{P12_{3T}*L13_{3T}}\right)} + \frac{\left(\frac{Pt_{3T}*L13_{3T}-}{Lt_{3T}*P13_{3T}}\right)}{\left(\frac{L12_{3T}*P13_{3T}-}{P12_{3T}*L13_{3T}}\right)}; \quad (15)$$

and $$n_{3T} = \frac{\left(\frac{L_{3T}*P12_{3T}-}{P_{3T}*P12_{3T}}\right)}{\left(\frac{L12_{3T}*P13_{3T}-}{P12_{3T}*L13_{3T}}\right)} + \frac{\left(\frac{Lt_{3T}*P12_{3T}-}{Pt_{3T}*L12_{3T}}\right)}{\left(\frac{L12_{3T}*P13_{3T}-}{P12_{3T}*L13_{3T}}\right)}. \quad (16)$$

Herein, the compensation amounts mx and nx (x=2T, 3T) are preferably rounded off to whole numbers from first decimal places. The recording and reproducing apparatus preferably pre-stores the target values Ltx and Ptx for each of the types of optical discs.

[Eighth Step]

In the first through seventh steps, edge shift amounts are measured for each of combinations between the mark length and the length of the forward and backward spaces. The average edge shift amount for each of the mark lengths is calculated from the measured results, and the recording pulse condition is adjusted based on the average edge shift amount. In such an example, the average edge shift amount is obtained by averaging out variances in the edge shift amounts due to the lengths of the spaces on the front and back of the mark. However, depending upon the type of the optical disc 101, thermal interferences between the marks and the spaces may vary significantly in accordance with the length of the spaces on the front and back of the mark. When data is written into such an optical disc, the recording pulse condition has to be altered to conform not only to the mark lengths but also to the length of the spaces on the front and back sides. When the length of the spaces on the front and back of the mark are taken into consideration, the number of combinations of the parameters which have to be included in the recording condition significantly increases along with the number of combinations between the mark lengths and the spaces lengths. When the number of the parameters which have to be adjusted by trial recording is large, a time period required for learning is long. Furthermore, a large number of tracks in the recording condition calibration area 1003 are consumed. Particularly, in an optical disc which can record data only once, such as a write-once read-many optical disc, the number of times of learning is limited due to limitation on the track number of the recording condition calibration area. Thus, it is preferable to suppress the number of the tracks consumed in learning for once as small as possible. Thus, in the eighth step, whether further compensation in view of the length of the spaces in front and back of the mark is necessary or not is determined based on the type of the optical disc 101 and the result of the first through seventh steps. When compensation is unnecessary, the ninth step and the following steps are skipped and the process is repeated from the fourth step. Particularly, at the fourth step in the second turn, recording pulse conditions G, H, and I shown in FIG. 12 are used instead of the recording pulse conditions D, E, and F shown in FIG. 5. Therefore, for compensating the recording pulse condition, only average edge shift amounts for each mark lengths are used. Since parameters to be compensated are limited, a time period required for adjusting the recording pulse conditions can be further reduced. Also, quality of the mark can be further improved. On the other hand, when further compensation in view of the length of the spaces in front and back of the mark is necessary (for example, when the optical disc 101 is of a type which requires such compensation, or compensations of edge shift amounts of the mark is insufficient from the results of the first through seventh steps), the process proceeds to the ninth step where further adjustment on the recording pulse conditions in accordance with the length of the spaces in front and back of the mark.

At the eighth step, necessity of further adjustment on the recording pulse conditions in accordance with the length of the spaces in front and back of the mark is quantitatively determined as follows. The recording pulse condition calculation unit 110 calculates dispersion values, $\sigma_{xSiM}^2$ and $\sigma_{iMxS}^2$, of the edge shift amounts jSiM and iMjS in accordance with a length of the front and back spaces jT(j=2, 3, 4, 5 or larger) (i.e., root mean square values of differences between edge shift amounts jSiM and iMjS and average edge shift amounts xSiM and iMxS, and determines a square root of the average value of the obtained dispersion values $\sigma_{xSiM}^2$ and $\sigma_{iMxS}^2$ as an indicator $\sigma_{SP}$:

$$\sigma_{xS2M}^2 = [(3S2M - xS2M)^2 + (4S2M - xS2M)^2 + (5S2M - xS2M)^2]/3; \quad (17)$$

$$\sigma_{xS3M}^2 = [(2S3M - xS3M)^2 + (3S3M - xS3M)^2 + (4S3M - xS3M)^2 + (5S3M - xS3M)^2]/4; \quad (18)$$

$$\sigma_{xS4M}^2 = [(2S4M - xS4M)^2 + (3S4M - xS4M)^2 + (4S4M - xS4M)^2 + (5S4M - xS4M)^2]/4; \quad (19)$$

$$\sigma_{2MxS}^2 = [(2M3S - 2MxS)^2 + (2M4S - 2MxS)^2 + (2M5S - 2MxS)^2]/3; \quad (20)$$

$$\sigma_{3MxS}^2 = [(3M2S - 3MxS)^2 + (3M3S - 3MxS)^2 + (3M4S - 3MxS)^2 + (3M5S - 3MxS)^2]/4; \quad (21)$$

$$\sigma_{4MxS}^2 = [(4M2S - 4MxS)^2 + (4M3S - 4MxS)^2 + (4M4S - 4MxS)^2 + (4M5S - 4MxS)^2]/4; \text{ and} \quad (22)$$

$$\sigma_{SP} = \text{sqrt}[(\sigma_{xS2M}^2 + \sigma_{xS3M}^2 + \sigma_{xS4M}^2 + \sigma_{2MxS}^2 + \sigma_{3MxS}^2 + \sigma_{4MxS}^2)/6]. \quad (23)$$

Herein, a deviation $\sigma_{xSiM}$ represents a magnitude of a variation in leading edges in accordance with space lengths immediately before iT marks (i=2, 3, 4 or larger). A deviation $\sigma_{iMxS}$ represents a magnitude of a variation in trailing edges in accordance with space lengths immediately before iT marks. The $\sigma_{SP}$ obtained by equation (23) is used as an indicator representing a magnitude of a length for each of the space lengths independent from lengths of the marks on the front and back sides. For example, dispersion $\sigma_{xS2M}^2$ may be calculated using weighting coefficients $C_{sm32}$, $C_{sm42}$, and $C_{sm52}$ as in equation (24) instead of equation (17):

$$\sigma_{xS2M}^2 = [C_{sm32}*(3S2M-xS2M)^2 + C_{sm42}*(4S2M-xS2M)^2 + C_{sm52}*(5S2M-xS2M)^2]/3. \quad (24)$$

Herein, the weighting coefficient $C_{smj2}$ (j=3, 4, 5) represents a probability that a 2T mark appears after a jT space. Other dispersion values may be calculated using similar weighting. In this way, dispersion values in accordance with frequency that each of the combinations between the mark lengths and the space lengths appear may be obtained.

The recording pulse condition calculation unit 110 further compares the indicator $\sigma_{SP}$ with a predetermined reference value. When the indicator $\sigma_{SP}$ is larger than the reference value, the edge shift amount is changed too largely in accordance with a length of the space in front or back of the mark. Thus, it is determined that further adjustment on the recording pulse condition in accordance with the length of the space in front or back of the mark is necessary. In such a case, the process proceeds to the ninth step, and the recording pulse condition is adjusted for each of the combinations between the mark lengths and the space lengths. On the other hand, when the indicator $\sigma_{SP}$ is smaller than the reference value, it is determined that further adjustment on the recording pulse condition in accordance with the length of the space in front or back of the mark is unnecessary. The process returns to the fourth step, and compensation of the recording pulse condition for respective mark lengths is repeated.

[Ninth Step]

In order to adjust the recording pulse conditions for each of the combinations between the mark lengths and the space lengths, trial recording is performed as follows.

Recording pulse conditions used for the trial recording are shown in FIG. 14. The recording pulse condition G is the recording pulse condition obtained by compensation at the seventh step. The recording pulse condition calculation unit 110 first sets values of parameters included in the recording pulse condition G as initial values. Next, the recording pulse condition calculation unit 110 increases the initial values of two parameters, dTtop and Ttop, included in the recording pulse condition G by one unit for a combination of a 2T space and a 3T mark immediately after, a combination of a 2T space and a mark having a length of 4T or longer which immediately follows, and a combination of a space having a length of 5T or longer and a 2T mark immediately after, and stores them along with other initial values as recording pulse condition J.

The recording and reproducing apparatus uses each of the recording pulse conditions G and J and performs trial recording of the specific recording pattern used in the fourth step onto a recording condition calibration learning area 1002 of the optical disc 101 (see FIG. 10) as in the second step. In other words, the above-mentioned recording pattern is sequentially recorded on the recording condition calibration area 1002 for the recording pulse conditions G and J.

An influence of thermal interference between a mark and a space on the edge shift amount is large for a mark following a short space and for a shortest mark (2T mark). Thus, in the ninth step, as described above, parameters related three patterns of combinations, the combination of a 2T space and a 3T mark, the combination of a 2T space and a mark having a length of 4T or longer, and the combination of a space having a length of 5T or longer and a 2T mark, are respectively increased by one unit (see FIG. 14). However, adjustment of parameters is not limited to this pattern. Particularly, a parameter related to a combination of another mark length and another space length may be changed. Alternatively, instead of values of the parameters dTtop and Ttop, which are grouped in accordance with a length of a space immediately before the mark, values of parameters Tlp and dTe, which are grouped in accordance with a length of a space immediately after the mark, may be changed.

[Tenth Step]

The recording and reproducing apparatus measured the edge shift amount for each of the combinations between the mark lengths and the space lengths as described below. First, the recording patterns are reproduced from tracks where the above-mentioned recording pattern is recorded with the recording pulse conditions G and J. Then, the edge shift detection unit 109 measures the edge shift amount of the reproduction signals as in the third and fifth steps. The edge shift amounts for all the combinations between the mark lengths and the space lengths shown in FIG. 11 are measured.

[Eleventh Step]

The recording and reproducing apparatus makes determination similar to that in the eighth step. First, the recording pulse condition calculation unit 110 calculates the indicator $\sigma_{SP}$ based on the edge shift amount obtained at the tenth step, and compares the obtained indicator $\sigma_{SP}$ with a predetermined reference value. When the indicator $\sigma_{SP}$ is larger than the reference value, it is determined that the edge shift amount in accordance with a length of a space before or after the mark is too large. In such a case, the process proceeds to the twelfth step. On the other hand, when the indicator $\sigma_{SP}$ is smaller than the reference value, it is determined that the edge shift amount in accordance with a length of a space before or after the mark is sufficiently small. The process of optimizing the recording pulse condition is finished.

[Twelfth Step]

The recording pulse condition calculation unit 110 calculates the amount of compensating the recording pulse condition based on the edge shift amount detected by the edge shift detection unit 109 at the tenth step. Parameters used in such calculation are as follows:

Edge shift amounts with recording pulse conditions G and J, 2S3M(G), 2S4M(G), 5S2M(G), 2S3M(J), 2S4M(J), and 5S2M(J);

Differences between the edge shift amounts with recording pulse conditions G and J, $e_{2S3M}$, $e_{2S4M}$, and $e_{5S2M}$; and Compensation amounts of the recording pulse conditions, $q_{2S3M}$, $q_{2S4M}$, and $q_{5S2M}$ (preferably, the compensation amounts, $q_{2S3M}$, $q_{2S4M}$, and $q_{5S2M}$ are represented by integral multiples of the unit of the parameter of the recording pulse conditions).

First, the recording pulse condition calculation unit 110 respectively calculates the differences $e_{2S3M}$, $e_{2S4M}$, and $e_{5S2M}$ between the edge shift amounts 2S3M, 2S4M, and 5S2M among signals generated when the recording patterns recorded with recording pulse conditions G and J are reproduced by the following equations:

$$e_{2S3M} = 2S3M(J) - 2S3M(G);$$

$$e_{2S4M} = 2S4M(J) - 2S4M(G); \text{ and}$$

$$e_{5S2M} = 5S2M(J) - 5S2M(G).$$

Next, the recording pulse condition calculation unit 110 calculates the compensation amounts $q_{2S3M}$, $q_{2S4M}$, and $q_{2S3M}$ which are necessary for changing all the edge shift amounts 2S3M, 2S4M, and 5S2M with the recording pulse condition G to the target value 0 based on the differences between the edge shift amounts, $e_{2S3M}$, $e_{2S4M}$, and $e_{5S2M}$ with the following shift compensation equations (25) through (27):

$$2S3M + e_{2S3M} * q_{2S3M} = 0; \quad (25)$$

$$2S4M + e_{2S4M} * q_{2S4M} = 0; \text{ and} \quad (26)$$

$$5S2M + e_{5S2M} * q_{5S2M} = 0. \quad (27)$$

The shift compensation equations (25) through (27) have the meaning as described below. Based on the setting at the ninth step, the values of the parameters dTtop and Ttop of the recording pulse condition J which are related to the combination of a 2T space and a 3T mark immediately after, the combination of a 2T space and a mark having a length of 4T or longer which follows immediately after, and the combination of a space having a length of 5T or longer and a 2T mark immediately after are different from those of the recording pulse condition G by one unit (see FIG. 14). Accordingly, the differences between the edge shift amounts between the recording pulse conditions G and J, $e_{2S3M}$, $e_{2S4M}$, and $e_{5S2M}$, are generated due to changes in the parameters dTtop and Ttop by one unit. Herein, it is assumed that changes in the edge shift amounts accompanied with the changes in the parameters dTtop and Ttop are both proportional to the changes in the parameters dTtop and Ttop (linear approximation). Such an assumption leads to the following result: if data is recorded with the recording pulse condition having the initial values of the parameters dTtop and Ttop changed by the compensation amounts $q_{2S3M}$, $q_{2S4M}$, and $q_{5S2M}$, the edge shift amount in the signal when such a recording pattern is reproduced is changed from the edge shift amounts 2S3M, 2S4M, and 5S2M when the recording pulse condition G is used by a product of the differences between the edge shift amounts with recording pulse conditions G and J, $e_{2S3M}$, $e_{2S4M}$, and $e_{5S2M}$, and the compensation amounts $q_{2S3M}$, $q_{2S4M}$, and $q_{5S2M}$. Therefore, if data is recorded with the recording pulse condition having values of parameters changed from the initial values using the compensation amounts $q_{2S3M}$, $q_{2S4M}$, and $q_{5S2M}$, which simultaneously satisfy the shift compensation equations (25) through (27), the edge shift amounts all match the target value 0 in the signal generated when such a recording pattern is reproduced. Based on the linear approximation of the shift compensation equations (25) through (27), compensation amounts required for optimizing the recording pulse conditions can be determined by calculation from the measured values of differences between the edge shift amounts. Preferably, the compensation amounts $q_{2S3M}$, $q_{2S4M}$, and $q_{5S2M}$ are calculated from the following equations (28) through (30) obtained by solving the shift compensation equations (25) through (27):

$$q_{2S3M} = -2S3M/e_{2S3M}; \quad (28)$$

$$q_{2S4M} = -2S4M/e_{2S4M}; \text{ and} \quad (29)$$

$$q_{5S2M} = -5S2M/e_{5S2M}. \quad (30)$$

Preferably, the compensation amounts $q_{2S3M}$, $q_{2S4M}$, and $q_{5S2M}$ obtained from equations (28) through (30) are further rounded off to integer values from the first decimal points. The recording pulse condition calculation unit 110 uses the compensation amounts $q_{2S3M}$, $q_{2S4M}$, and $q_{5S2M}$ obtained in this way to compensate the recording pulse conditions as described below. First, the recording pulse condition calculation unit 110 increases the initial values G of the parameters dTtop and Ttop by the compensation amount $q_{2S3M}$ for the combination of a 2T space and a 3T mark:

2T space/3T mark: $dTtop = G + q_{2S3M}$; and 2T space/3T mark: $Ttop = G + q_{2S3M}$.

The recording pulse condition calculation unit 110 compensates initial values G of the parameters dTtop and Ttop by the compensation amounts $q_{2S4M}$ and $q_{5S2M}$ similarly for the combination of a 2T space and a mark of a length 4T or longer and a combination of a space of a length 5T or longer and a 2T mark:

2T space/4T or longer mark: $dTtop = G + q_{2S4M}$;

2T space/4T or longer mark: $Ttop = G + q_{2S4M}$;

5T or longer space/2T mark: $dTtop = G + q_{5S2M}$; and 5T or longer space/2T mark: $Ttop = G + q_{5S2M}$.

The recording pulse condition calculation unit 110 replaces the recording pulse condition G with the recording pulse condition K obtained by the above compensation as the initial condition. Then, the process is repeated from the ninth step. Particularly, at the ninth step in the next turn, the values of the parameters of the recording pulse condition K are set as initial values instead of the recording pulse condition G.

In the shift compensation equations (28) through (30), the target value for the length shifts and the phase shift is uniformly set to zero. In this way, the recording pulse condition is optimized such that a rate of occurrence of errors in the maximum likelihood decoding process is minimized. When it is desired to strike a preferable balance between the rate of occurrence of errors in the maximum likelihood decoding process and other indicators representing the quality of the reproduction signal (for example, jitters, jitters after limit equalizer, and the like), the target value may be set as a value different from 0, and a different value may be set for each of the combinations of mark lengths and space lengths.

Preferably, a difference in length shifts and a difference in phase shifts between the reference recording pulse condition and the recording pulse condition for mark length adjustment, and a difference in length shifts and a difference in phase shifts between the reference recording pulse condition and the recording pulse condition for mark phase adjustment are recorded in the disc information pre-recorded area 1003 of the optical disc 101. Furthermore, a difference in the edge shift amounts between two sets of recording pulse conditions may be recorded for each of the combinations of the mark length and the space length. In such a case, the recording pulse condition demodulation unit 114 (see FIG. 1) reads out a difference in the length shifts and a difference in the phase shifts from the disc information pre-recorded area 1003 of the optical disc 101 when the optical disc 101 is loaded. In this way, at the seventh step, the difference in length shifts and the difference in the phase shifts read out from the optical disc 101 may be used for compensation. Similarly, at the twelfth step, the difference in the edge shift amounts previously read from the optical disc 101 may be used for compensation. Since only the reference recording pulse condition is used for actual trial writing, the number of times of trial writing can be further reduced.

Alternatively, the recording and reproducing apparatus may record the a difference in phase shifts between the reference recording pulse condition and the recording pulse condition for mark length adjustment, and a difference in length shifts and a difference in phase shifts between the reference recording pulse condition and the recording pulse condition for mark phase adjustment or a difference in the edge shift amounts between two sets of recording pulse conditions, which are used in the optimizing process described above, onto the optical disc 101. In this way, the recording for the next time, the recording pulse condition demodulation unit 114 can refer to these values. This allows the recording pulse condition to be optimized quickly.

The present invention relates to an optical disc recording and reproducing apparatus and a method for recording data by the same. As described above, the recording pulse conditions are optimized. Thus, the present invention is industrially applicable.

The invention claimed is:

1. A method for optimizing recording pulse conditions, comprising the steps of:

generating recording pulses using each of multiple sets of recording pulse conditions, each set of recording pulse conditions having portions of recording pulses which correspond to marks of two types or more, the portions in each set having different lengths or phases from lengths or phases of the portions of the recording pulses in the other sets of recording pulse conditions, and recording a specific mark-space pattern with each set of recording pulse conditions onto respective areas of tracks of a writable optical information recording medium based on the recording pulses;

measuring an edge shift amount of a reproduction signal for each of the areas of the tracks on which the specific pattern is recorded with each of the multiple sets of recording pulse conditions by reproducing a signal from each of the areas;

calculating a length shift or phase shift of a mark from the edge shift amount for each of the areas; and calculating compensation values for the recording pulse conditions according to a difference in lengths, based on the calculated length shifts, or a difference in phases, based on the calculated phase shifts, of the mark for each of the areas of the tracks on which the specific pattern is recorded with each of the multiple sets of the recording pulse conditions using an approximation that the difference in lengths or the difference in phases of the mark among the areas is proportional to the difference in the lengths or the difference in the phases of the portions of the recording pulses.

2. A method for optimizing recording pulse conditions according to claim 1, wherein the marks of two types or more include a shortest mark and a mark having a length next to that of the shortest mark.

3. A method for optimizing recording pulse conditions according to claim 1, wherein code lengths appear at substantially equal frequencies in a recording signal corresponding to the recording pulses.

4. A method for optimizing recording pulse conditions according to claim 1, wherein, among the multiple sets of recording pulse conditions, when a phase of a portion of a recording pulse which corresponds to one type of mark is advanced, phases of portions of recording pulses which correspond to other types of marks are delayed.

5. A method for optimizing recording pulse conditions according to claim 1, wherein:

the recording pulse includes a first pulse, a last pulse, or a cooling pulse; and, among the multiple sets of recording pulse conditions, a length, a phase, or a position of at least one of the first pulse, the last pulse, and the cooling pulse varies.

6. A method for optimizing recording pulse conditions according to claim 5, wherein:

between two of the multiple sets of recording pulse conditions, one or both of a length and a rising position of the first pulse vary; and between other two of the multiple sets of recording pulse conditions, one or both of a length and a phase of the last pulse, a phase of the first pulse, and a phase of the cooling pulse vary.

7. A method for optimizing recording pulse conditions according to claim 1, wherein the specific pattern includes marks and spaces having a length between twice and eight-fold the length of a recording clock cycle.

8. A method for optimizing recording pulse conditions according to claim 1, wherein:

compensation values of two parameters, m and n, are calculated from the following equations:

$$m = \frac{(P \times L13 - L \times P13)}{(L12 \times P13 - P12 \times L13)} + \frac{(Pt \times L13 - Lt \times P13)}{(L12 \times P13 - P12 \times L13)};$$

and $$n = \frac{(L \times P12 - P \times L12)}{(L12 \times P13 - P12 \times L13)} + \frac{(Lt \times P12 - Pt \times L12)}{(L12 \times P13 - P12 \times L13)}, \text{where:}$$

combinations of values of the two parameters vary among the multiple sets of recording pulse conditions;

a difference in lengths and a difference in phases of marks between two of the multiple sets of recording pulse conditions are referred to as L12 and P12;

a difference in lengths and a difference in phases of marks between other two of the multiple sets of recording pulse conditions are referred to as L13 and P13;

a length shift and a phase shift of marks recorded on tracks with one of the multiple sets of recording pulse conditions is referred as L and P; and target values of the mark length shift and the phase shift are referred to as Lt and Pt.

9. A method for optimizing recording pulse conditions according to claim 8, wherein the target values Lt and Pt are decided such that the quality of the reproduction signal is high.

10. A method for optimizing recording pulse conditions according to claim 8, wherein the target values Lt and Pt vary depending upon the mark length.

11. A method for optimizing recording pulse conditions according to claim 8, wherein one or both of the target values Lt and Pt are zero.

12. A method for optimizing recording pulse conditions according to claim 8, wherein the compensation values m and n are rounded off to integers.

13. A method for optimizing recording pulse conditions according to claim 8, wherein the steps are repeated until both the compensation values m and n become zero.

14. A method for optimizing recording pulse conditions according to claim 1, wherein the steps of measuring the edge shift amount of the reproduction signal further includes the steps of:

converting a digital signal produced from the reproduction signal to a digitized signal by a maximum likelihood decoding method;

selecting a pattern approximate to a shape of a portion of the digital signal which corresponds to an edge of a mark from a predetermined pattern group based on the digitized signal; and comparing the selected pattern with a shape of the portion of the digital signal.

15. A method for optimizing recording pulse conditions according to claim 1, wherein the step of measuring the edge shift amount of the reproduction signal includes the steps of:

measuring the edge shift amount for each of possible combinations between the mark lengths and space lengths;

calculating dispersion values SP among the combinations for differences between average values of respective edge shift amounts at a leading edge and a trailing edge of a mark and respective edge shift amounts for each of possible combinations between mark lengths and space lengths for each type of marks from the following equation, $$SP = \Sigma_{i,j} Csm[i][j] \times (SM[i][j] - AveSM[j])^2 + \Sigma_{i,j} Cms[i][j] \times (MS[i][j] - AveMS[i])^2, \text{ where}$$

a pair of integers (i, j) is a pair of integers greater than or equal to 2 except (2, 2), a variable SM[i][j] is an edge shift amount between a space which has a length i times the length of recording clock cycle T (hereinafter, referred to as an iT space) and the mark immediately after which has a length j times the length of recording clock cycle T (hereinafter, referred to as a jT mark), a variable MS[i][j] is an edge shift amount between the iT mark and a jT space immediately after;

a variable AveSM[j] is an average value of an edge shift amount of a leading edge of the jT mark, a variable AveMs[i] is an average value of an edge shift amount of a trailing edge of the iT mark, and a first coefficient Csm[i][j] and a second coefficient Cms[i][j] are predetermined numbers; and, when the dispersion value SP is smaller than a predetermined value, adjusting the recording pulse conditions on a mark basis, and, when the dispersion value SP is larger than the predetermined value, adjusting the recording pulse conditions on a combination basis.

16. A method for optimizing recording pulse conditions according to claim 15, wherein the first coefficient Csm[i][j] is represented as a rate of appearance of a combination of an iT space and a jT mark immediately after, and the second coefficient Cms[i][j] is represented as a rate of appearance of a combination of an iT mark and a jT space immediately after.

17. A method for optimizing recording pulse conditions according to claim 15, wherein the first coefficient Csm[i][j] and the second coefficient Cms[i][j] are one or zero.

18. A method for optimizing recording pulse conditions according to claim 1, further comprising a step of recording data representing a difference in lengths or a difference in phases of the mark between two of the multiple sets of recording pulse conditions onto the optical information recording medium.

19. A recording and reproducing apparatus for generating recording pulses using each of multiple sets of recording pulse conditions, each set of recording pulse conditions having portions of recording pulses which correspond to marks of two types or more, the portions in each set having different lengths or phases from lengths or phases of the portions of the recording pulses in the other sets of recording pulse conditions, and recording a specific mark-space pattern with each set of recording pulse conditions onto respective areas of tracks of a writable optical information recording medium based on the recording pulses, and measuring an edge shift amount of a reproduction signal for each of the areas of the tracks on which the specific pattern is recorded with each of the multiple sets of recording pulse conditions by reproducing a signal from each of the areas, the apparatus:

calculates a length shift or phase shift of a mark from the edge shift amount for each of the areas; and calculates compensation values for the recording pulse conditions according to a difference in lengths, based on the calculated length shifts, or a difference in phases, based on the calculated phase shifts, of the mark for each of the areas of the tracks on which the specific pattern is recorded with each of the multiple sets of the recording pulse conditions using an approximation that the difference in lengths or the difference in phases of the mark among the areas is proportional to the difference in the lengths or the difference in the phases of the portions of the recording pulses.

20. A semiconductor integrated circuit incorporated into a recording and reproducing apparatus for generating recording pulses using each of multiple sets of recording pulse conditions, each set of recording pulse conditions having portions of recording pulses which correspond to marks of two types or more, the portions in each set having different lengths or phases from lengths or phases of the portions of the recording pulses in the other sets of recording pulse conditions, and recording a specific mark-space pattern with each set of recording pulse conditions onto respective areas of tracks of a writable optical information recording medium based on the recording pulses, and measuring an edge shift amount of a reproduction signal for each of the areas of the tracks on which the specific pattern is recorded with each of the multiple sets of recording pulse conditions by reproducing a signal from each of the areas, semiconductor integrated circuit:

calculates a length shift or phase shift of a mark from the edge shift amount for each of the areas; and calculates compensation values for the recording pulse conditions according to a difference in lengths, based on the calculated length shifts, or a difference in phases, based on the calculated phase shifts, of the mark for each of the areas of the tracks on which the specific pattern is recorded with each of the multiple sets of the recording pulse conditions using an approximation that the difference in lengths or the difference in phases of the mark among the areas is proportional to the difference in the lengths or the difference in the phases of the portions of the recording pulses.

21. An optical information recording medium, comprising an area on which data, which represents a difference in lengths and a difference in phases among marks recorded using each of two sets of recording pulse conditions, each set of recording pulse conditions having portions of recording pulses which correspond to marks of two types or more, the portions in each set having different lengths or phases from lengths or phases of the portions of the recording pulses in the other sets of recording pulse conditions, is recorded.

* * * * *